Patented Sept. 12, 1950

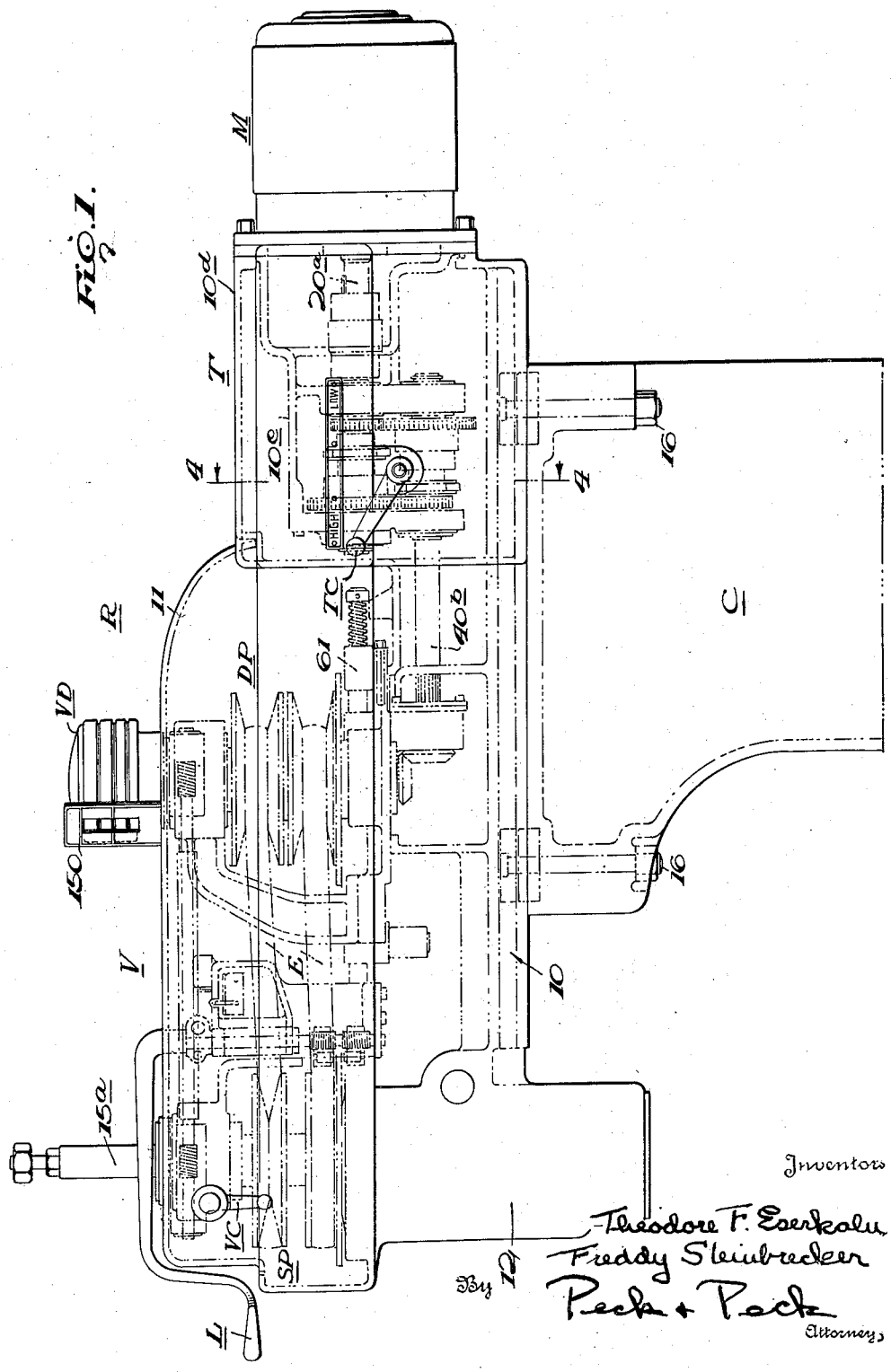

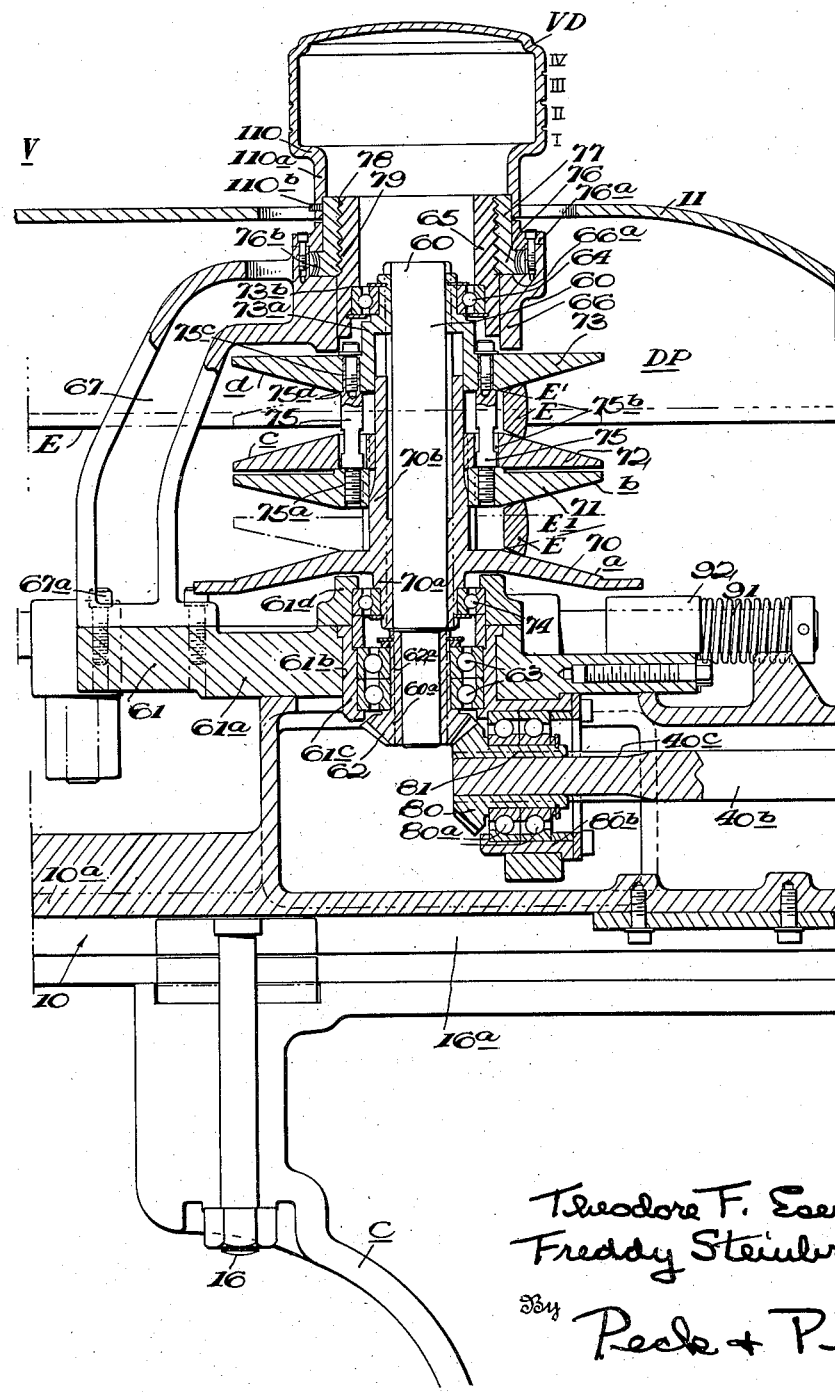

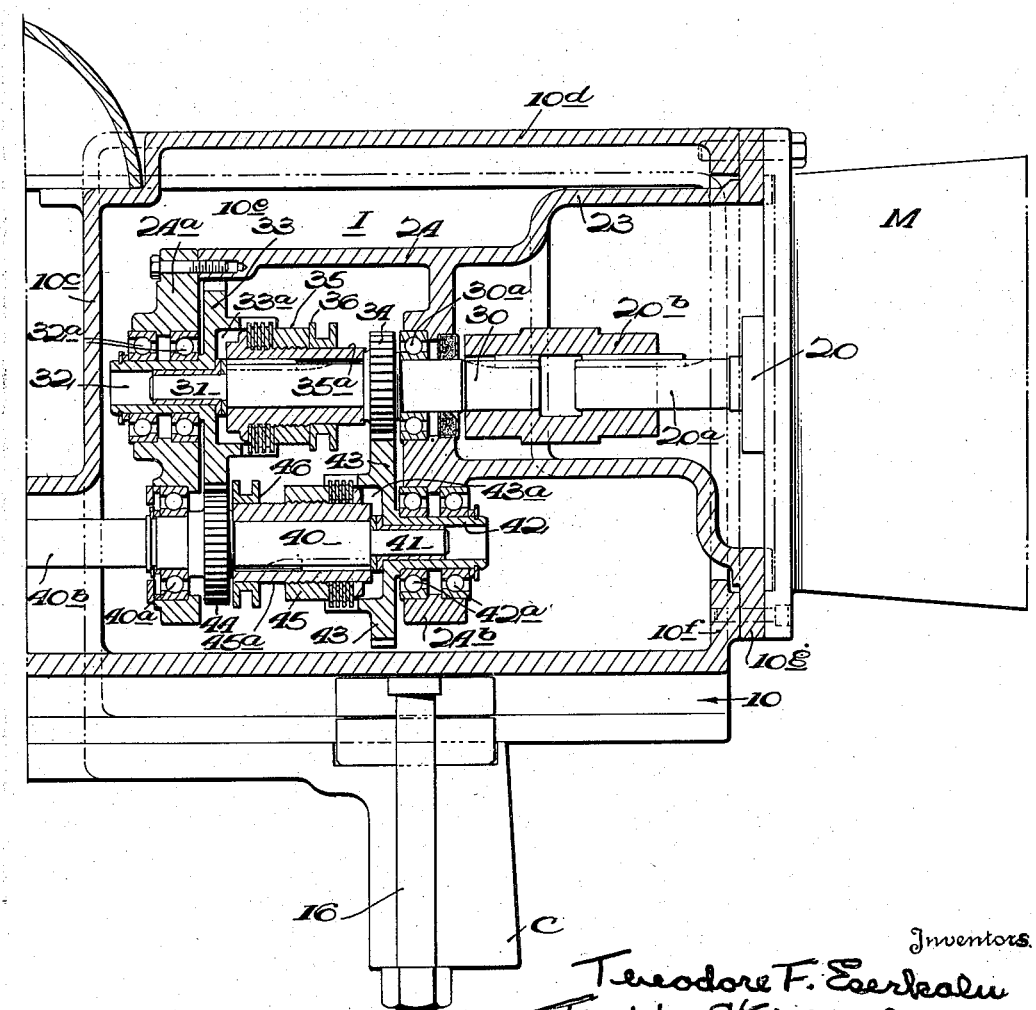

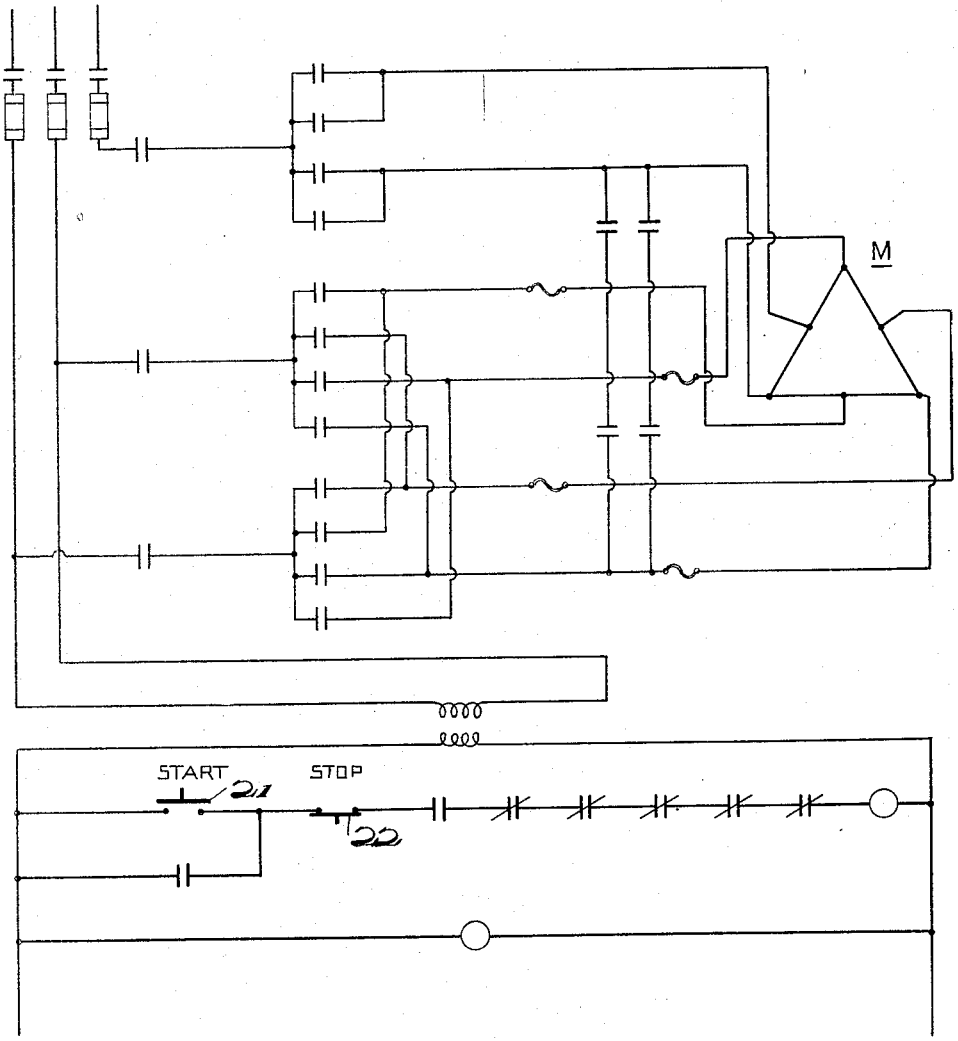

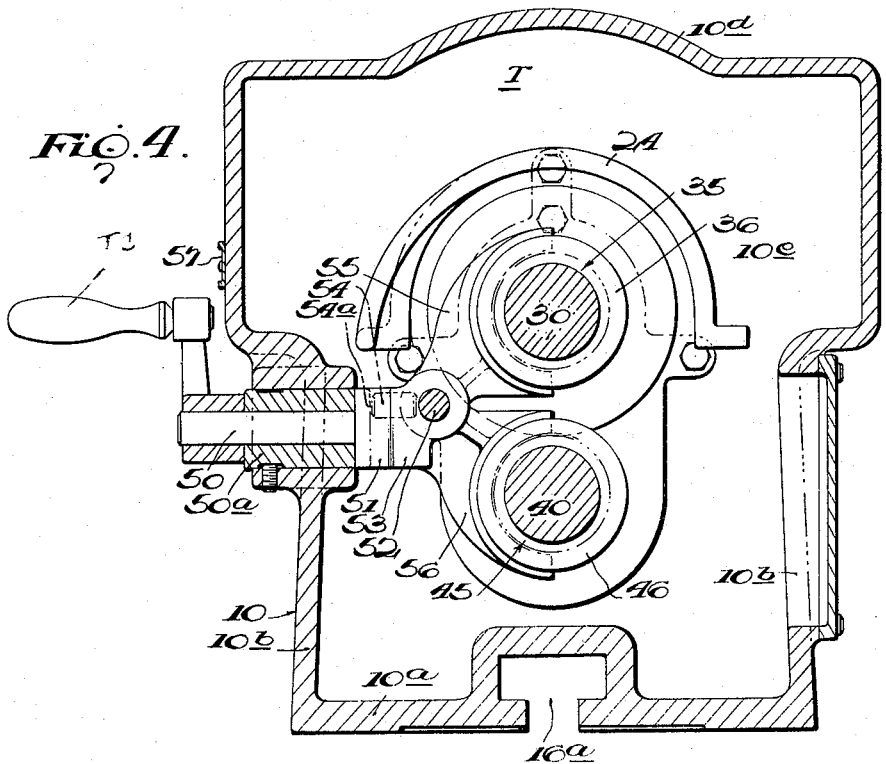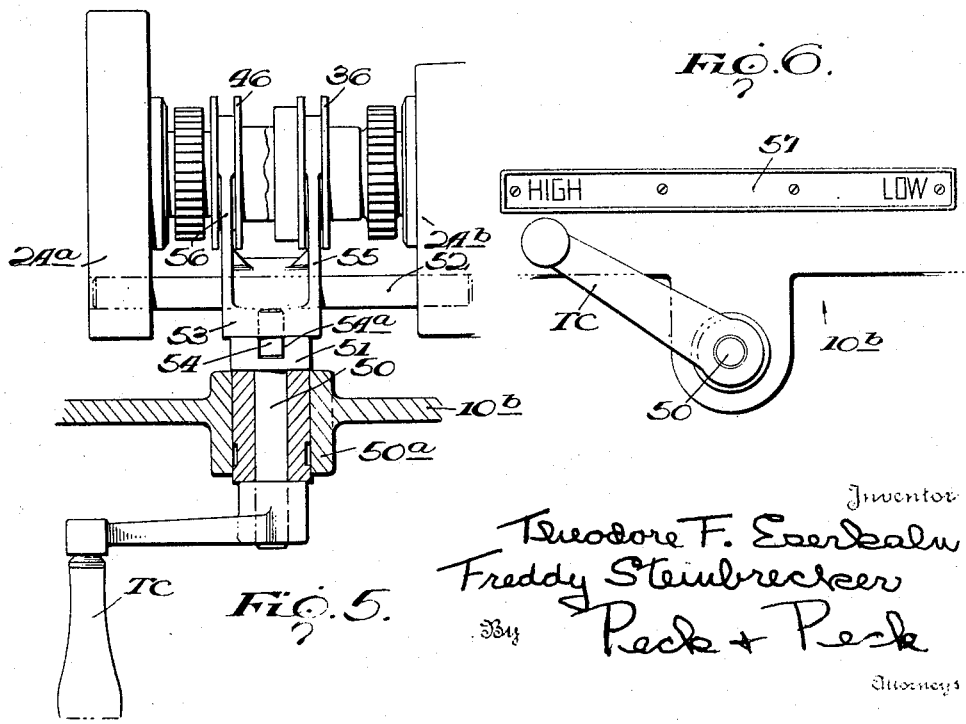

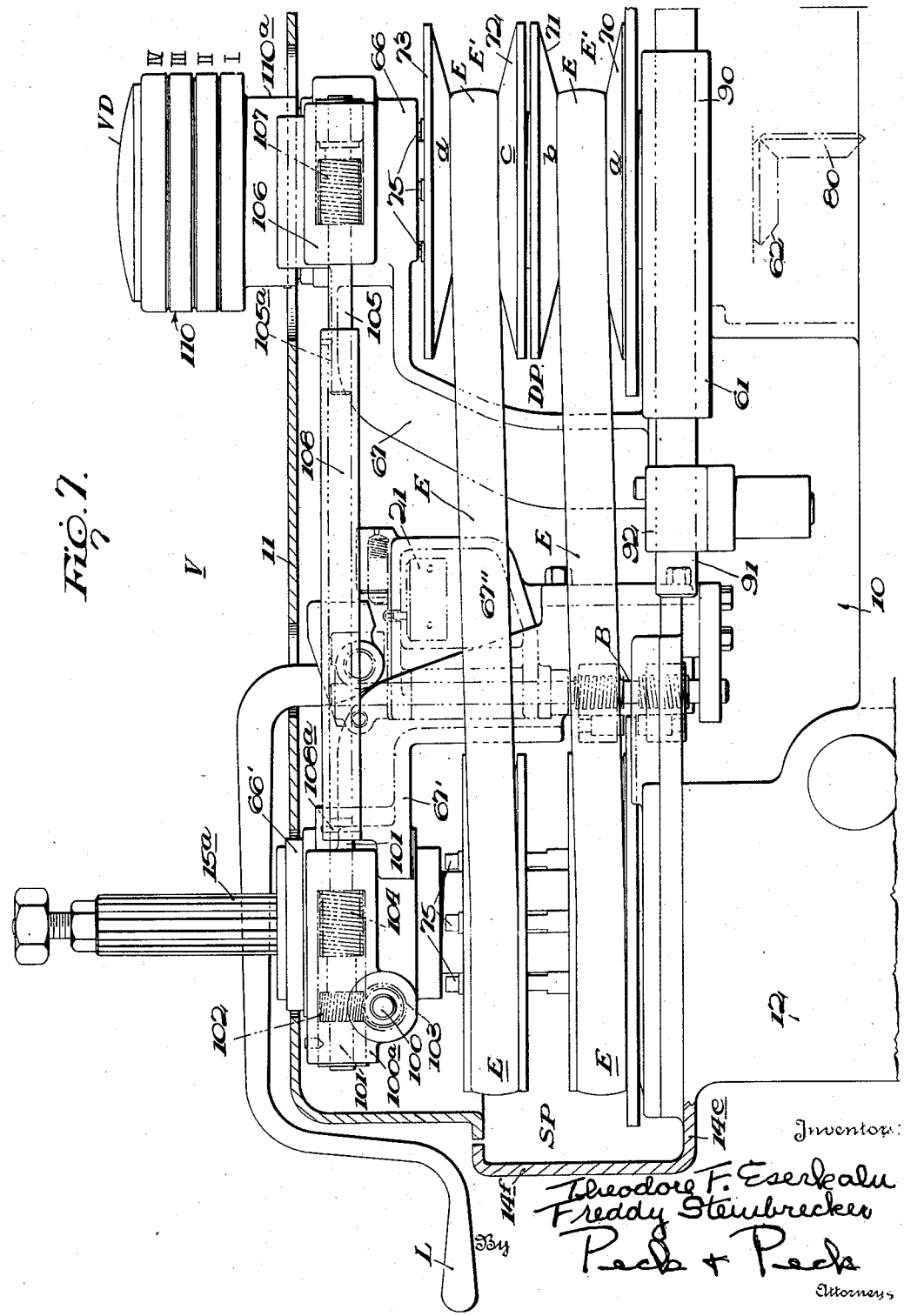

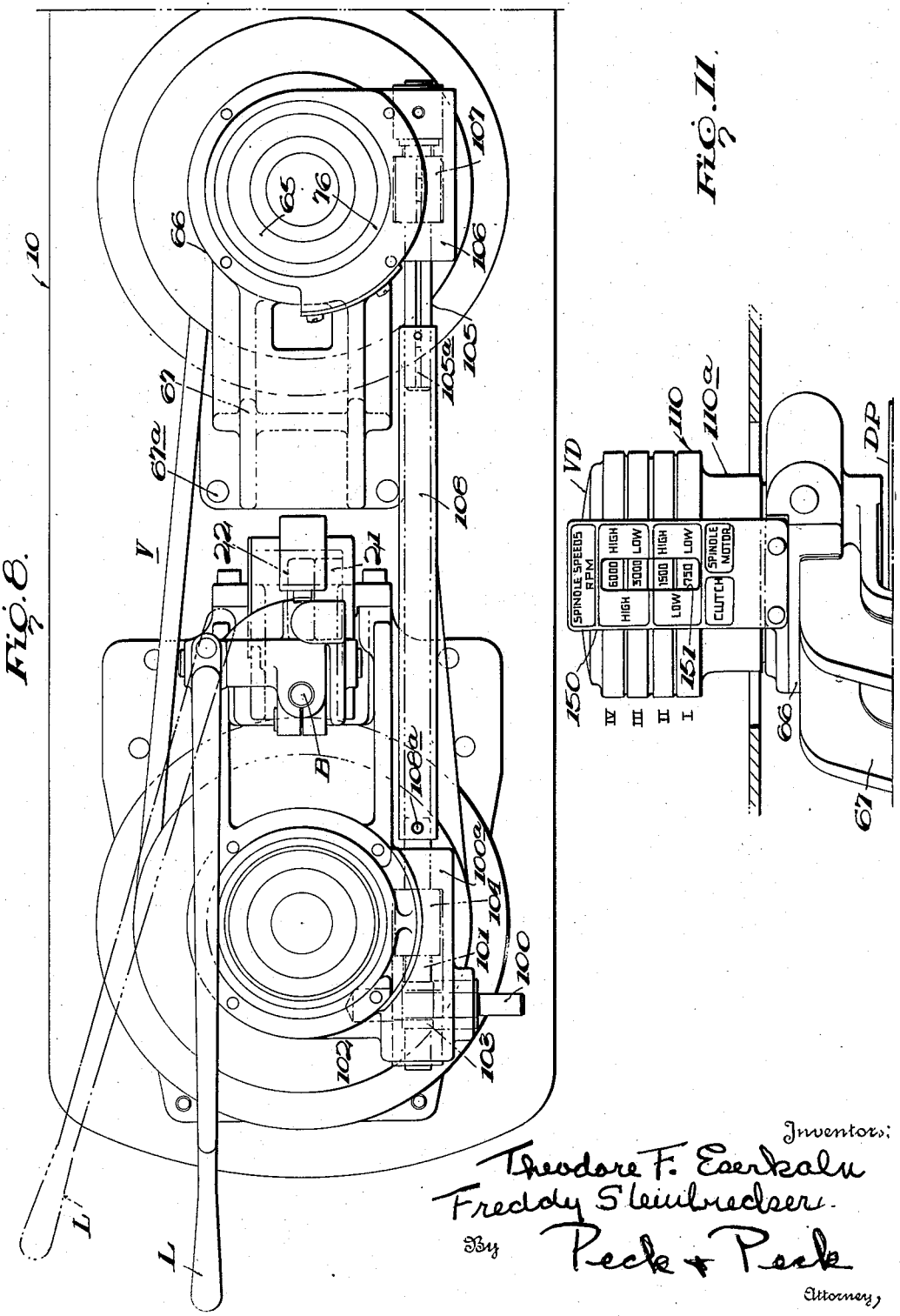

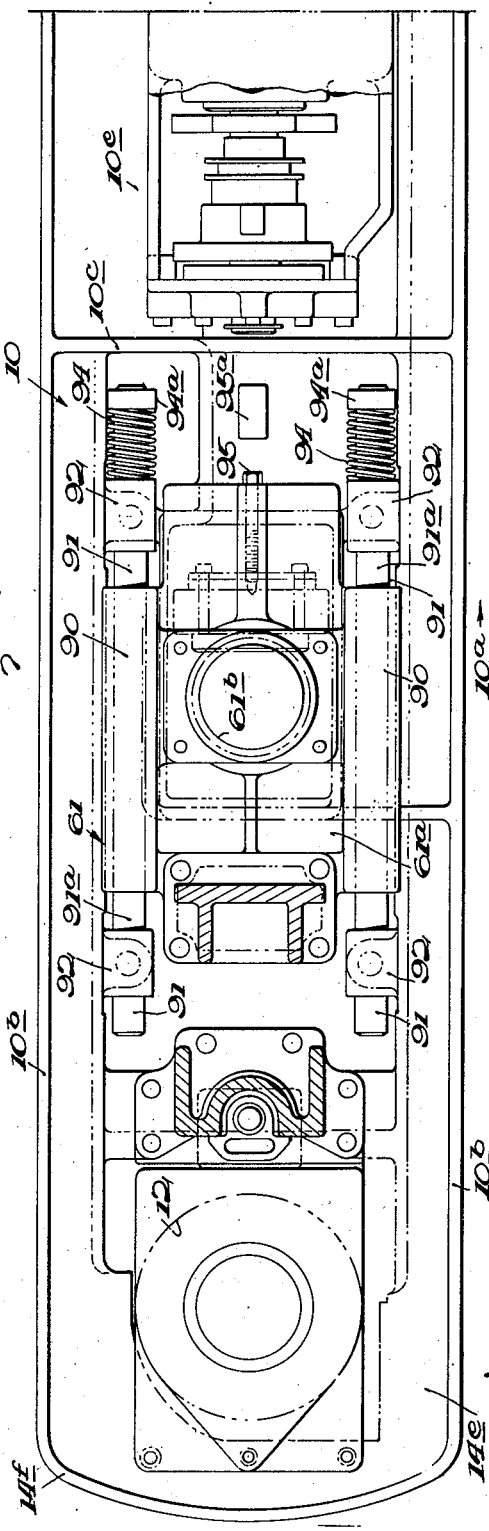

2,522,352

UNITED STATES PATENT OFFICE 2,522,352

INFINITELY VARIABLE SPEED, CUTTER SPINDLE DRIVE UNIT FOR MACHINE TOOLS

Theodore F. Eserkaln, Wauwatosa, and Freddy Steinbrecker, Racine, Wis., assignors to George Gorton Machine Company, Racine, Wis., a corporation of Wisconsin Application May 29, 1947, Serial No. 751,244

3 Claims. (Cl. 74—230.17)

1

This invention relates to infinitely variable speed, cutter spindle drive units for machine tools; and the nature and objects of the invention will be readily recognized and understood by those skilled in the art in the light of the following explanation and detailed description of the accompanying drawings illustrating what we now believe to be the preferred embodiments or mechanical expressions of the principles and several features of our invention from among various other embodiments, forms, arrangements, designs, mechanical expressions and combination, of which the invention is capable and adapted within the spirit and scope thereof.

The invention is concerned with machine tool cutter spindle drives of the infinitely variable speed types, and is primarily directed to overcoming certain of the problems and difficulties heretofore encountered with such types of drives, in order to provide a drive of the infinitely variable speed type which is capable of selective precision adjustment under the control of an operator, and which will be reliable and require a minimum of maintenance under the varied conditions encountered in operation and use.

It is a general object of the invention to provide a practical and efficient power transmission and variable speed drive mechanism for driving the cutter spindle of a machine tool, by which the speed of the cutter spindle may be infinitely varied between the end limits of a predetermined speed range, under the selective control of and precision adjustment by the machine tool operator without interrupting or stopping operation of the cutter spindle by the transmission and drive mechanism.

Another object is to provide such a power driven transmission and infinitely variable speed drive mechanism, in which the power driven transmission to the variable speed drive mechanism is so designed and arranged that the machine tool operator may selectively set up and adjust the transmission for operation to deliver any one of several different speeds to the variable speed drive mechanism, so that, such drive mechanism may thereafter be selectively adjusted for infinite speed variations through a speed range between the end limits of adjustment of such drive mechanism, as determined by the selected speed delivered to such mechanism by the power driven transmission.

Another object is to increase the number of different speeds at which the variable speed drive mechanism may be driven by the transmission by providing a motor capable of selective opera-

2 tion at different speeds for driving the transmission, in order to increase the number of different speed ranges through which the speed of the cutter spindle driven by the drive mechanism may be infinitely varied.

Another object is to provide a design and arrangement of the power driven change speed transmission for driving the infinitely variable speed drive mechanism for the cutter spindle, which includes an operator controlled clutching and speed changing mechanism by which the transmission may be adjusted and set to deliver a selected different speed to the variable speed drive mechanism without stopping the operation of the transmission driving motor or the operation of the change speed transmission and variable speed drive mechanism.

And a further object is to provide a single control element by which an operator may from a single control point, selectively make the speed change adjustments of the transmission through the medium of the clutch and change speed mechanism thereof, in order to set the transmission to deliver a desired speed to the infinitely variable speed drive mechanism.

Another object of the invention is to provide a single element operator control for selectively adjusting the infinitely variable cutter spindle drive mechanism, independently of the operator control for the change speed transmission.

A further primary object of the invention is to provide such a motor driven transmission and infinitely variable speed drive mechanism for a machine tool cutter spindle, which is mounted on a cutter spindle mounting structure, such as the cutter spindle carrying adjustable ram of a machine tool, so as to form with the cutter spindle mounting structure a completely self-contained unit.

Another object is to so relatively mount and functionally combine the mechanisms and elements, including the motor for driving the transmission, as to provide for maximum compactness with accessibility to the elements and mechanisms making up the unit.

Another object is to mount and locate the operator control for the change speed transmission and the operator control for the variable speed drive mechanism at convenient and readily accessible points on the unit.

And another object is to provide such an infinitely variable speed drive mechanism with a readily visible speed indicator dial which automatically functions simultaneously with and by operator adjustment of the cutter spindle drive mechanism, to indicate the cutter spindle speed for each adjustment of the variable speed drive mechanism.

A further object is to provide such a change speed transmission and infinitely variable speed drive mechanism for a machine tool cutter spindle and the like, in which the variable speed drive mechanism is of the multiple V-belt type utilizing variable effective diameter pulleys for simultaneous adjustment for infinite speed variations throughout the range of adjustment; and further to provide a mechanically simple and efficient operator controlled mechanism for simultaneously adjusting the pulleys of the drive from a single control point simultaneously with and without stopping or interrupting the operation of the drive and the cutter spindle driven thereby.

Other objects are to provide an efficient design and construction of spindle drive mechanism of the infinitely variable speed type utilizing multiple V-belts and variable effective diameter driving and driven pulleys, in which the design and construction of the pulleys and the arrangement of the drive mechanism is such that the driving and driven pulleys and corresponding elements thereof are of identical design and construction, so that these pulleys are interchangeable; to provide a mechanically simple and efficient mounting for the driving pulley by which that pulley "floats" under a spring loading so as to maintain constant belt tension on the multiple V-belts associated with said pulleys; and further to provide an arrangement of driving and driven pulley mounting and supporting structure or brackets by which a belt or belts may be removed from or mounted in operative relation on the pulleys without requiring any disassembly and removal or replacement and reassembly of the drive mechanism and its mounting and supporting structure.

Another object is to provide a construction and mounting for a variable effective diameter pulley and its adjusting mechanism, by which such pulley and adjusting mechanism, together with the supporting structure therefor, provides a complete self-supporting unit, which while adapted to receive and to drive or be driven by a shaft, is not dependent upon such shaft for either mounting or for aligning or positioning support, but is completely operable and adjustable with or without a shaft being associated therewith; and further to provide an infinitely variable speed drive comprising such self-supporting variable effective diameter pulley units and their adjusting mechanism, in belted driving connection with each unit being adapted to receive a shaft and to have driving or driven relation with such shaft, but without mounting support from such shaft.

And the invention holds as a further object the provision of designs and construction of infinitely variable speed drive mechanisms of the multiple V-belt, variable effective diameter pulley types, which are of general utility as variable speed drive mechanisms, apart from their association and combination with the power driven change speed transmission and the cutter spindle supporting structure or ram making up the self-contained variable speed spindle drive unit of the present invention.

With the foregoing general objects, features and results in view, as well as certain others which will be readily apparent from the following explanation and detailed description, the invention consists in certain novel features and in designs, constructions, arrangements, mounting and combination of elements and organizations, all as will be more fully and particularly referred to and specified hereinafter.

Fig. 1 is a view in side elevation of the self-contained spindle mounting ram and variable speed spindle drive unit of the invention, the unit being shown in adjustably mounted position on the column of a vertical spindle machine tool, and the change speed transmission and infinitely variable spindle speed drive mechanism being indicated therein in dotted lines.

Figs. 2A, 2B and 2C, together constitute a vertical longitudinal section through the spindle mounting ram and variable speed drive unit of Fig. 1, Fig. 2A being a section through the forward, cutter spindle mounting end of the ram and the spindle driving pulley of the variable speed drive; Fig. 2B being a section through the driving pulley of the variable speed spindle drive; and Fig. 2C being a section through the change speed transmission of the unit.

Fig. 3 is a purely schematic view showing a wiring diagram for the motor and operating circuits therefor of the ram and drive unit.

Fig. 4 is a vertical transverse section through the unit of Fig. 1, taken as on the line 4—4 of Fig. 1.

Fig. 5 is a detailed view in top plan of the change speed transmission showing particularly the operator controlled clutch actuating mechanism for such transmission.

Fig. 6 is a detailed view in side elevation showing the manual control lever for operating the clutch actuating mechanism of the change speed transmission, together with the associated indicia plate for indicating the operating positions of the lever.

Fig. 7 is an enlarged view in side elevation of the infinitely variable, spindle speed drive and the operator controlled adjusting mechanism therefor, of the unit of Fig. 1.

Fig. 8 is a top plan view of the drive and adjusting mechanism of Fig. 7.

Fig. 9 is a top plan view of the ram structure and the floating carriage for the driving pulley of the variable speed drive mechanism, the driving pulley assembly having been removed from the carriage, and the bracket structures for the driving pulley and the driven spindle pulley being shown in horizontal cross section.

Fig. 10 is a detailed view in vertical axial section through one of the support and guide rods and its anti-friction mounting, of the driving pulley supporting carriage, the carriage actuating spring mounted on said rod being also shown in section.

Fig. 10A is a vertical transverse section taken as on the line 10A—10A of Fig. 10.

Fig. 11 is a view in elevation of the index plate for the spindle speed indicator dial.

Figure 2A:
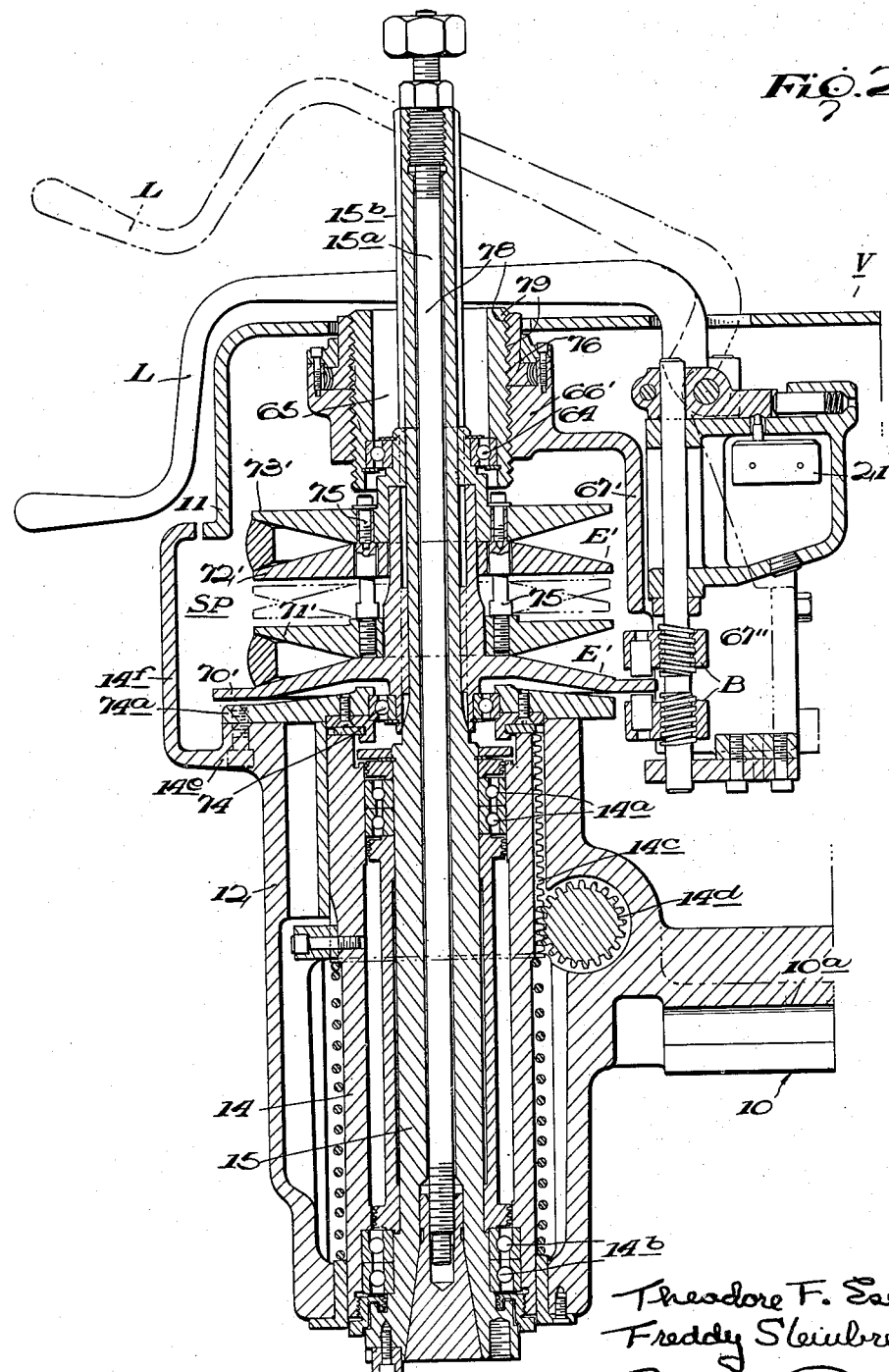

The feature of the invention which provides as a self-contained unit, a cutter spindle carrying structure and a power driven transmission and infinitely variable speed drive mechanism for said spindle, is expressed in the selected example thereof as being embodied in a cutter spindle carrying structure for a machine tool of the vertical cutter spindle type in which the spindle carrying structure is mounted in the machine tool organization for generally horizontal adjustment to position the cutter spindle relative to a work table located below such spindle. Such vertical cutter spindle types of machine tools having a cutter spindle carrying structure or ram adjustably mounted on the machine tool main frame or column, are generally typified, for example, in the United States patents to George Gorton, No. 1,862,052, dated June 7, 1932, and No. 2,320,776, dated June 1, 1943, to which reference may be had for a disclosure of the general organization of such types of machine tools and of forms of adjustably mounted, cutter spindle carrying rams. In the illustrated example of a cutter spindle carrying ram and spindle drive mechanism of the invention, referring to the accompanying drawings, it has been deemed necessary to disclose only the upper end portion of the main frame or column C of such general type of machine tool, on which the ram and drive unit R of the invention is mounted and supported for horizontal adjustment.

However, the references to the above identified U. S. patents are not intended to limit or rstrict the spindle ram and variable speed drive unit of the present invention to adaptation to or use with vertical spindle types of machine tools, either generally or of the particular design and construction of such type of machine disclosed in said patents, or to the particular designs, and arrangements of and the adjustable mountings for the spindle carrying ram structures disclosed in such patents. The self-contained unit of the invention may be embodied in various other forms and arrangements for adaptation to use with various other types of machine organizations; and further, certain components, elements and organizations of the power driven transmission and infinitely variable speed drive mechanism are of general adaptability to the driving of spindles, shafts or the like driven elements, other than cutter spindles without being combined in a ram unit, or in the particular combination of power transmission and drive of this example, and all within the scope of the present disclosure of the hereinafter appended claims.

The spindle carrying ram and drive unit R of the instant embodiment includes the ram structure 10 of generally elongated, rectangular box-like construction, which may, if desired, be formed of a single casting. The ram structure 10 basically includes a base or lower wall 10a, the opposite vertically disposed side walls 10b, and a vertically disposed transverse wall 10c which extends across the structure 10 between and joined with the opposite side walls 10b. The transverse wall 10c is located spaced a distance inwardly from the rear end (the right hand end when viewing Fig. 1) of ram structure 10, and an upwardly arched top wall 10d extends over and across the structure between transverse wall 10b and the rear end of the structure, between and joining the opposite side walls 10b, as will be clear by reference to Fig. 4 of the drawings. Thus, an enclosed compartment 10e is formed within the rear end portion of the ram structure 10 for purposes to be referred to and explained hereinafter. The top wall 10d may be formed and cast integral with the transverse wall 10c and the opposite side walls 10b. The rear end of ram structure 10 is formed to provide an opening defined and surrounded by a flange forming frame portion 10f, which may, as in the example hereof, be formed integral with the lower, side and top walls of the structure. A motor mounting collar or ring 10g may be provided on and secured to the rear side of flange 10f.

The portion of ram structure 10 between the transverse wall 10c and the forward end of the ram structure 10 is formed open at the upper side thereof and is adapted to mount and receive the infinitely variable speed drive mechanism of the invention, as will be described hereinafter. A suitable removable cover 11 is provided for closing the open upper side of the ram structure.

The forward end of the ram structure 10 is provided with a vertically disposed cutter head 12, which in this instance is formed integral with the ram structure and extends a distance upwardly above and depends a distance downwardly below the base or lower wall 10a, as will be clear by reference to Fig. 2A. This cutter head 12 is formed with an axial bore extending vertically therethrough for receiving and vertically reciprocally mounting a cutter spindle carrying sleeve or quill 14, in which a cutter spindle 15 is rotatably journaled in any usual or desired manner, as for example, by the spaced upper and lower sets of anti-friction bearings 14a and 14b of the radial and thrust type. Thus, the cutter spindle 15 is vertically reciprocal as a unit with the quill 14 in and through the cutter head 12. Any suitable or usual mechanism may be provided for vertically reciprocating the spindle quill 14 to raise and lower the cutter spindle from and to operative relation with a work piece mounted on the usual work table (not shown) located on a machine beneath the cutter head. Such mechanism may, for example, embody a rack 14c provided on the quill 14 in vertically disposed position at the inner side of the exterior thereof, and in mesh with a suitable pinion 14d mounted on the ram structure 10 for rotation about a horizontal axis by any of the usual and well known manually controlled operating means (not shown) for raising and lowering the spindle quill 14 and the cutter spindle 15.

The cutter head 12 is, in this instance, formed integral with the base or lower wall 10a of the ram structure and a horizontally disposed wall 14e extends therefrom in elevated position above the main base wall 10a. A vertically disposed forwardly curved front wall 14f extends upwardly from and in this instance integral with the forward side of the horizontal wall 14e. The opposite ends of front wall 14f join and merge with the forward ends, respectively, of the opposite vertical side walls 10b of the ram structure 10.

The ram and drive unit R which includes the ram structure 10, is mounted, in the type of machine of this example, in horizontally disposed position, extending on and across the upper end of the main machine frame or column C for horizontal adjustment in either direction along a straight line path to position the cutter head 12 with the cutter spindle 15 in a desired adjusted position relative to the work table (not shown) of the machine. Any suitable means, such for example as the bolts 16 mounted in the upper end of the column C and operatively engaged in a groove or slot 16a formed in and along the under side of the lower wall 10a of structure 10, may be utilized for detachably securing the unit R in any horizontally adjusted position on column C, and for releasing the unit for horizontal adjustment, as will be readily understood by those familiar with this art.

*Self-contained ram and spindle drive unit*

In accordance with the invention, the self-contained cutter spindle carrying ram and spindle drive unit R basically embodies and includes the cutter spindle 15 and ram structure 10 with which are associated and mounted in operative combination and relation, a motor M mounted and carried on the ram structure 10 at the rear end thereof; a change speed transmission and clutch unit T mounted on the ram structure 10 enclosed within the compartment 10e which is formed in the rear end portion of such structure, said unit T being operatively coupled with and driven by the motor M; and an infinitely variable speed drive mechanism or unit V mounted on and within the ram structure 10 between the transmission unit T and the cutter spindle 15 which is mounted at the forward end of the ram structure, with said variable speed mechanism V being driven by the change speed transmission T and being operatively coupled with and driving the cutter spindle 15.

The unit R further includes a suitable single operator control element, such as the hand lever TC, which is conveniently located on a side of the ram structure 10 for selectively operating the actuating mechanism for adjusting the change speed transmission to deliver different speeds to the infinitely variable speed mechanism V; and also includes a suitable single operator control element, such as the hand crank VC, located on a side of the ram structure 10 convenient to an operator for selectively operating the mechanism for adjusting the infinitely variable speed unit V to operate the cutter spindle 15 at a desired speed of rotation within the range of adjustment of the unit V as determined by the selected driving speed delivered to the variable speed unit V by the change speed transmission T.

Suitable indicia are provided of a form readily visible by an operator at the different positions of adjustment of the hand lever TC for the different speeds, respectively, of the transmission T, so as to visually indicate to an operator the different transmission speed adjustment positions of lever TC. An indicator dial VD is mounted in readily visible position extending upwardly from the unit R for automatic operation by actuation of the adjusting mechanism for the variable speed unit V, to visually indicate to an operator the rate of speed of rotation of the cutter spindle 15 at each position of adjustment of the unit V by the hand crank VC.

*The motor*

The motor M is, in this particular example, of the constant horse-power type having two (2) different speeds of operation at which it may be selectively operated. A wiring diagram for such type of motor is purely schematically shown in Fig. 3, of the drawings and is of a generally conventional character and will be readily understood by those familiar with this type of motor and the operating circuits thereof. The motor M includes a main driven shaft 20, and in the selected example hereof, the two (2) operating speeds of the motor rotate the motor shaft 20 at two (2) rates of speed, respectively, namely, a low speed of 850 R. P. M. and a high speed of 1725 R. P. M. However, attention is here directed to the fact that the invention is not limited or restricted to these particular rates of speed of shaft operation in a two-speed motor, or, in fact, to the use of a two-speed motor, as a multi-speed motor having more than two (2) speeds may be employed, if desired. And it is to be further noted that the invention is not essentially limited to the use of a multi-speed motor as a single speed motor may be employed, if found desirable or expedient under the conditions and requirements encountered by any particular adaptation and use of the invention.

The operator control (not shown) for selectively conditioning the motor M and its operating circuits, for operation at either its high speed or its low speed, may be located at any suitable or convenient point on the ram unit R or in the machine organization with which the unit R is used.

The main operator control of the motor circuits for starting and stopping operation of the motor M, is preferably mounted on and carried by the ram structure 10 as a part or element of the self-contained ram and drive unit R. Such main operator control may take any usual or desired form, but in this particular example, such control, referring now to Fig. 2A of the drawings, is provided as a combined spindle brake and motor circuit controlling switch organization, which includes a common manual operating lever L pivotally mounted to the rear of the cutter spindle 15 on a bracket element of the variable speed drive mechanism mounted on the ram structure 10, in operative association with a spindle brake mechanism B and motor circuit controlling electrical switches consisting of the starting switch 21 and the stop switch 22. As this combined motor circuit switch and brake mechanism forms no part of the present invention, it is deemed unnecessary to describe the same herein in detail. Suffice it to say, that the manually actuated lever L is vertically swingable to actuate the motor starting switch 21 and is horizontally swingable to actuate the motor circuit stop switch 22 to stop operation of the motor and apply the brake mechanism B in that sequence. The upwardly swung position of lever L to actuate starting switch 21 is indicated in dotted lines in Fig. 2A of the drawings. The starting switch 21 and motor stop switch 22 are indicated schematically in the motor circuit diagram of Fig. 3 of the drawings. Obviously, any other suitable operator control for the motor circuits for starting and stopping operation of motor M may be utilized, if desired or found expedient.

*The change speed transmission*

The change speed transmission T, including the operating clutches thereof, is provided as a unit which is removably mounted and housed within the compartment 10e provided in the rear end portion of the ram structure 10, and, in this instance, includes a casing formed of a shaft tunnel forming section 23, and a change speed gear and clutch housing and mounting section 24. The shaft tunnel section 23 of the casing is mounted in horizontally disposed position extending forwardly from the rear end of ram structure 10 a distance into chamber 10e, being suitably attached at its rear end to and supported from the rear end of structure 10. The change speed gear and clutch mounting section 24 of the casing is mounted and secured on the forward end of casing section 23 within chamber 10a, and extends forwardly therefrom to and terminates spaced from the transverse wall 10c of ram structure 10. The section 24 is of greater depth than the depth of the shaft tunnel forming section 23, and depends a distance downwardly within chamber 10e below the casing section 23, as will be clear by reference to Fig. 2C of the drawings.

The change speed gearing of the transmission T is, in this instance, of the two-speed type, that is, the transmission is capable of adjustment to deliver either of two (2) different speeds, a low speed or a high speed, to the driving or output shaft from the transmission. The change speed gearing of the transmission includes a horizontally disposed input or driven shaft 30 coupled with and driven by the motor M, and a parallel countershaft 40 spaced therebelow and constituting the driving or output shaft of the transmission.

These driven shafts 30 and 40 are adapted to be operatively connected in driving relation by a low speed gear set formed by the small diameter gear 34 on shaft 30 in constant mesh with a larger diameter gear 43 on shaft 40; and a high speed gear set, constituted by a large diameter gear 33 on shaft 30 in constant mesh with a smaller diameter gear 44 on shaft 40. In this instance, the smaller diameter gears 34 and 44 of the low and high speed gear sets, respectively, are fixed to their respective shafts 30 and 40 for rotation therewith, while each of the larger diameter gears 33 and 43 of the gear sets, respectively, is mounted on its respective shaft 30 or 40 for rotation of the gear on and independently of its shaft, and for rotation of such shaft independently of its gear. With the gears 33 and 43 of the high and low gear sets both conditioned for rotation independently of their respective shafts 30 and 40 (neutral condition), rotation of the driven shaft 30 will not impart rotation to the driving shaft 40 because the small diameter gear 34 fixed on shaft 30 will merely rotate the large diameter gear 43 of the low speed gear set on and independently of shaft 40, while shaft 30 will rotate independently of the large diameter gear 33 of the high speed gear set, so that no rotary motion will be transmitted to the gear 44 fixed on shaft 40, by the idle gear 33.

Gears 33 and 43 of the high and low speed gear sets, respectively, are adapted to be engaged with their respective shafts 30 and 40 by means of suitable multiple disc clutch units 35 and 45 mounted on shafts 30 and 40, respectively, in operative association with the respective gears 33 and 43, for simultaneous operation to alternately clutch gear 33 into driving relation with shaft 30 (high speed) and declutch gear 43 from driving relation with shaft 40, (idling) or declutch gear 33 from shaft 30 (idling) and clutch gear 43 into driving relation with shaft 40 (low speed). In this manner the low and high speed gear sets may be rendered selectively operable to place the driven shaft 30 in driving relation with the driving shaft 40 so that the latter shaft is operated at the selected low or high speed of operation.

In this specific example which is not to be considered as restrictive or limiting, the small diameter gears 34 and 44 which are fixed on the shafts 30 and 40, respectively, are each of identical dimensions and the larger diameter gears 33 and 43 are of identical dimensions with each gear set having a 2:1 gear ratio. As hereinbefore explained, the motor M is of the two-speed type having a low speed of operation at which motor shaft 20 is rotated at 850 R. P. M., and a high speed of operation at which motor shaft 20 is rotated at 1725 R. P. M. As motor shaft 20 in this example is directly coupled to the driven shaft 30, this latter shaft will be driven by the motor at similar rates of rotation for high and low speed operations, respectively, of motor M. The motor M is capable of operation at either of two speeds, so that, if the two delivery speeds for which transmission T is capable of operation are each different from each of said motor speeds, it then follows that the transmission T is capable of being selectively operated at any one of four (4) different delivery or output speeds for the driving shaft 40.

In this particular example embodiment of the change speed transmission unit T, the high speed and low speed gear sets thereof are designed with gear ratios such that when the driven shaft 30 is rotated at the low speed of operation of 850 R. P. M. and the change speed transmission is adjusted for operation of the low speed gear set 34—43, the driving shaft 40 will be operated at 425 R. P. M., while if the transmission is adjusted for operation of the high speed gear set 33—44, the driven shaft 40 will be operated at 1700 R. P. M. If the motor M is operated at high speed to rotate the driven shaft 30 of transmission T at 1725 R. P. M., then if the transmission is adjusted for operation of the low speed gear set 34—43, the driving shaft 40 of the transmission will be operated at 862 R. P. M., and if the transmission is adjusted for operation of the high speed gear set 33—44, then the driving shaft 40 will be operated at 3450 R. P. M.

In the specific construction and arrangement of the change speed transmission T of the illustrated example, referring to Fig. 2C, the driven shaft 30 may be supported and journaled at its rear end in an annular, anti-friction bearing assembly 30a which is mounted in a suitable bearing carrier supported from casing section 24. Shaft 30 is extended rearwardly through this bearing assembly a distance into the forward end of the shaft tunnel formed by the casing section 23; and the rear end of this shaft 30 is connected by a suitable shaft coupling 20b with the forward end of a shaft section 20a which may either consist of a forward extension of the motor shaft 20, or of a suitable shaft section coupled at its rear end to the forward end of motor shaft 20. The large diameter gear 33 of the high speed gear set is provided with a forwardly extending hollow hub 32 which is mounted and rotatably journaled in a set of annular, anti-friction bearing assemblies 32a in the vertically disposed forward wall 24a of the casing section 24, gear 33 being located at the inner end of said hub within casing section 24 in proximity to the inner side of the wall 24a but having operating clearance therewith. The forward end of the driven shaft 30 is formed with a reduced diameter section 31 which extends forwardly into and is rotatably received and journaled in the hollow hub 32 of the gear 33. Gear 33 is thus mounted on the reduced diameter section 31 of shaft 30 for rotation thereon independently thereof and of shaft 30, or for rotation of shaft 30 independently of said gear.

The driving or output shaft 40 is supported by and journaled at its forward end in an annular, anti-friction bearing assembly 40a which is mounted in the forward wall 24a of casing section 24 below shaft 30 and the bearing assemblies 32 thereof. Shaft 40 at its forward end extends through bearing assembly 40a and wall 24a to provide an extended shaft section 40b (see Fig. 2B) for operative connection with the infinitely variable speed, spindle drive mechanism V of the invention to be hereinafter described and explained. The large diameter gear 43 of the low speed gear set is in all respects similar to gear 33 of the high speed gear set which is mounted on shaft 30, and this gear 43 is provided with a rearwardly extending hollow hub 42 which is mounted and rotatably journaled in a set of anti-friction bearing assemblies 42a mounted in a vertically disposed wall portion 24b of casing section 24 below bearing assembly 30a for the rear end of shaft 30 thereabove. Gear 43 is thus located at the inner end of said hub within casing section 24 adjacent the inner side of wall portion 24b in proximity thereto but having operating clearance therewith. The rear end of the driving shaft 40 is formed with a reduced diameter section 41 which extends rearwardly into and is rotatably received and journaled in the hollow hub 42 of the gear 43. Gear 43 is thus mounted on reduced diameter rear end section 41 of shaft 40 for rotation thereon independently thereof, and of shaft 40, or for rotation of shaft 40 independently of said gear.

The clutch units 35 and 45 which are mounted on the shafts 30 and 40, respectively, for selective operation to engage and release gears 33 and 43 from driving relation with their respective shafts, are similar and each is of a familiar and well-known multiple disc type of clutch unit. For example, the clutch unit 35 is mounted on shaft 30 concentric with such shaft positioned between the gears 33 and 34 and in operative association with gear 33 for clutching engagement and disengagement with that gear through the medium of the usual multiple disc clutching mechanism of the clutch unit. The body of the clutch unit 35a mounted on shaft 30 is keyed to that shaft for rotation therewith and the end of the clutch unit adjacent gear 33 extends into a recess 33a formed in the inner side of the gear body concentric with the axis of the gear for placing the clutch unit in relation with the gear for operation of the multiple disc clutching mechanism of the unit to engage and disengage the gear and thus place the gear in driving and non-driving relation with the shaft 30. The body of the clutch unit 35 is formed with a reduced diameter section 35a at the end thereof opposite gear 33, and the usual grooved clutch actuating collar 36 is mounted on such reduced diameter section for sliding movement thereon axially thereof. Axial movement of collar 36 toward gear 33 actuates the multiple disc clutch mechanism to engage gear 33 so that the gear is rotated by shaft 30, while axial movement of the collar away from gear 33 actuates the multiple disc clutch mechanism to disengage and release gear 33 from driving connection with shaft 30 for rotation of shaft 30 and clutch unit 35 independently of the gear. The grooved actuating collar 36 on the clutch unit 35 is shown in Fig. 2C, in position with the clutch engaging gear 33 to place the gear in driving connection with shaft 30.

The clutch unit 45 which is mounted on shaft 40 between gears 43 and 44 is similar to clutch unit 35 generally described hereinabove, but is mounted with its reduced diameter section 45a located at the forward end thereof adjacent the small diameter gear 44. The end of clutch unit 45 which is adjacent gear 43 is extended into a recess 43a formed in the inner side of the gear body concentric with the axis of the gear, for placing the clutch unit 45 in relation with the gear for operation of the multiple disc clutching mechanism to engage and disengage gear 43. Clutch unit 45 is provided with the grooved clutch actuating collar 46 mounted on the reduced diameter section 45a of the clutch body for sliding movement axially thereon toward gear 43 to actuate the multiple disc clutching mechanism to engage such gear with shaft 30 and for movement in a direction away from gear 43 to actuate the multiple disc clutching mechanism to disengage and release gear 43 for rotation of shaft 40 and of the clutch unit 45 independently of gear 43. The clutch actuating collar 46 is shown in Fig. 2C, in position with the multiple disc clutching mechanism of unit 45 actuated to disengage gear 43 for rotation of said gear on and independently of driving shaft 40.

Operator control mechanism for simultaneously actuating the clutch units 35 and 45 is provided and is so arranged that when one of these clutch units is in clutched position engaging its gear with its respective shaft, the other clutch unit is always in disengaged position releasing its gear from driving relation with its respective shaft. Such operator controlled mechanism, referring now to Figs. 4, 5 and 6, includes and features a single manual operating element, such as the hand lever TC which is located at the exterior of one side wall 10b of the ram structure 10, in this instance the right hand side wall when facing the front of the unit R, adjacent the rear end of such structure at the location of the transmission T therein.

The hand crank TC is mounted on and extends radially upwardly from the outer end of a horizontally disposed shaft 50 which is mounted and rotatably journaled in a suitable bearing 50a mounted in the side wall 10b, with the shaft extending inwardly and transversely through wall 10b in the bearing 50a. The shaft is located in a horizontal plane generally midway or intermediate the axes of the vertically spaced driven and driving shafts 30 and 40 of the transmission unit, and an eccentric 51 is fixed on the inner end of shaft 50 for rotation by that shaft. A rod 52 is mounted in horizontal position extending between and with its forward and rear ends mounted fixed in the forward wall portion 24a and the rear wall portion 24b, respectively, of the casing section 24 (see Fig. 5). This rod 52 is mounted with its axis parallel to the axes of shafts 30 and 40 and is located with its axis in the horizontal plane which passes between the vertically spaced clutch units 35 and 45 on shafts 30 and 40. A slide block 53 is slidably mounted on and carried by rod 52 for axial movement in either direction thereon, and this block mounts and carries an actuating pin 54 extending outwardly therefrom and received and engaged in a slot or groove 54a formed in the inner side of eccentric 51 disposed extending radially thereof. Pin 54 engages in slot 54a at a location radially spaced from or eccentric relative to the axis of disc 51 and its shaft 50. Thus, by swinging hand crank TC to the right or to the left, shaft 50 is correspondingly rocked and through the medium of the eccentric 51 and pin 54, will slide block 53 axially of rod 52 to the right or to the left therealong, that is forwardly or rearwardly relative to ram unit R.

The slide block 53 mounts and carries a fork member 55 fixed thereon which extends upwardly and inwardly from the rear side thereof, and also mounts a similar fork member 56, fixed thereon which extends downwardly and inwardly from the forward end of the block. The fork member 55 is operatively engaged in the grooved clutch actuating ring 36 of the clutch unit 35, while the fork member 56 is operatively engaged in the grooved clutch actuating ring 46 for the clutch unit 45. These fork members are fixed on slide block 53 and are movable therewith axially of rod 52 to simultaneously move their respective clutch actuating rings 36 and 46 axially of clutch units 35 and 45.

In operation, when hand lever TC is swung forwardly to its limit of forward movement, the slide block 53 is moved forwardly on rod 52 so that fork 55 moves the actuating ring 36 of clutch unit 35 forwardly to clutched position connecting gear 33 with driven shaft 30 so that driving shaft 40 is then driven by the high speed gear set 33—44. In this operation of the change speed transmission, the fork member 56 is simultaneously moved forwardly to move actuating ring 46 of clutch unit 45 forwardly to declutched position of that unit with gear 43 thus disengaging gear 43 from driving connection with shaft 40. Gear 43 is then in condition to be driven idly by the gear 34 on shaft 30. When hand lever TC is swung from its forward or high speed position rearwardly to its limit of rearward swing, the reverse operation of the clutches takes place, and actuating ring 36 is moved rearwardly to position declutching clutch unit 35 and disengaging gear 33 of the high speed gear set from shaft 30, while actuating ring 46 is simultaneously moved rearwardly to position actuating clutch unit 45 to engage gear 43 of the low speed gear set with the driving shaft 40, so that, shaft 40 is then driven at low speed by gears 34 and 43.

By the use of the clutch units 35 and 45 in the arrangement as above described, of the multiple disc type, the change speed transmission is operable to change from high to low speed or from low to high speed adjustment, without stopping operation of the motor M and the driven shaft 30, the clutch units merely passing momentarily through their neutral positions in a transitory movement.

The high and low speed positions of the hand lever TC are preferably indicated by readily visible markings on the outer side of the wall 10b of ram structure 10. For example, a suitable dial or indicator plate 57 bearing the notations "High" and "Low" at its opposite forward and rear ends, respectively, may be employed for this purpose. The plate 57 is secured in such position above and relative to hand lever TC that the handle end of this lever will be positioned below and in line with the notation "High" for the forwardly swung high speed position of the lever, and below and in line with the notation "Low" when the lever is in its rearwardly swung low speed position, as will be clear by reference to Fig. 6 of the drawings.

*Infinitely variable speed, spindle drive mechanism*

The cutter spindle 15 of the ram unit R is driven from the power driven change speed transmission T of the unit through the medium of an embodiment of the infinitely variable speed drive mechanism V of the present invention. Such drive mechanism V is, in this instance, of the multiple V-belt, variable effective diameter pulley type, capable of adjustment under the control of the machine operator, during and without interrupting the operation of the drive, for infinite variation of the speed of the cutter spindle 15 between the end limits of the maximum range of adjustment of such drive mechanism.

In this example the variable speed drive mechanism V utilizes two (2) V-belts, and includes a driving pulley DP and a driven or cutter spindle pulley SP with each of such pulleys providing two (2) V-belt receiving grooves and each being so constructed and arranged as to permit of infinitely variable adjustments in the effective diameters of such pulley grooves through the maximum range of adjustment of said pulleys. The spindle pulley SP is mounted supported independently of but splined to the section 15a of the cutter spindle which extends vertically upwardly above cutter head 12 of ram structure 10, section 15a being provided with splines 15b received in spline ways provided by the pulley structure. The mounting arrangement is such that rotation of the pulley SP will rotate cutter spindle 15 while permitting that spindle to move vertically upwardly and downwardly axially through and relative to the pulley. The driving pulley DP receives a vertical shaft 60 for rotation therewith and thereby, but the pulley is mounted and supported independently of the shaft. The shaft 60 is mounted in position spaced to the rear of cutter spindle 15 on the ram structure 10, parallel with the cutter spindle. The vertical shaft 60 is driven by the change speed transmission T from a forward extension 40b of the driving or output shaft 40 of the transmission. The spindle pulley SP which receives the cutter spindle 15 in driving relation therewith is driven by and from the driving pulley DP through the medium of the two V-belts E which are mounted on and which extend between and operatively associate the pulleys DP and SP, such belts E being received in the respective V-belt grooves E' formed in and by the pulleys, as will be clear by reference to Figs. 2A and 2B.

The driving pulley DP receives the vertical shaft 60, being suitably keyed thereto for rotation by and with the shaft, and the shaft 60 is mounted on and carried independently of the pulley, by a horizontal carriage 61 which includes a horizontal base or bed plate 61a. Referring now to Fig. 2B, the bed plate 61a is formed with a generally centrally located vertical bore or opening 61b therethrough in which a vertically disposed, annular bearing receiving sleeve or ring 61c is mounted. The lower end of vertical shaft 60 is positioned in and extends axially through sleeve 61c in bed plate 61a and is provided with suitable splines 60a thereon. A bevel gear 62 is mounted on the lower end of shaft 60 for rotating such shaft and is provided with a hub 62a having an axial bore therethrough for receiving shaft 60. The gear hub 62a extends vertically upwardly from the gear 62 through bearing ring 61c, on shaft 60. The gear 62 and its hub 62a are formed with suitable spline grooves therein which receive shaft splines 60a, respectively, and thus key the gear to the shaft for rotation therewith. The lower end of shaft 60 and the bevel gear 62 thereon are mounted and journaled in bed plate 61a of carriage 61, by a set of annular, anti-friction bearing assemblies 63 which are mounted on and around the bevel gear hub 62a positioned and secured in the space between that hub and the bearing mounting ring 61c.

A bevel gear 80 is positioned at the rear side of shaft 60 in mesh with the bevel gear 62 mounted on the lower end of shaft 60. Gear 80 is mounted in vertically disposed position for rotation around a horizontal axis aligned with the axis of the horizontal driving or output shaft extension 40b from transmission T, and is positioned and journaled in a set of annular, anti-friction bearing assemblies 80a secured in a bearing carrier 80b which is fixed on and depends from the carriage 61. Bevel gear 80 is provided with a rearwardly extended hub portion 81 which is received and mounted in bearing assemblies 80a. An axial bore is formed extending completely through bevel gear 80 and its hub 81 and is provided with suitable splineways therein. The forward end of shaft extension 40b from transmission T is provided with suitable splines 40c thereon and extends into and through the axial bore of bevel gear 80 with the splines 40c slidably received in the splineways formed in the gear and hub, so that the bevel gear 80 is keyed to shaft 40b for rotation thereby while the bevel gear is slidable axially in either direction on and relative to shaft 40b. In this manner power is transmitted from shaft 40 through the engaged bevel gears 80 and 62, to the pulley shaft 60 for driving such shaft and the pulley DP thereon.

The upper end of the shaft 60 is positioned by and journaled in an annular, anti-friction bearing assembly 64 which is mounted and positioned between the upper end structure of the pulley DP and a vertically disposed pulley adjusting sleeve 65. The sleeve 65 is slidably mounted for vertical reciprocation in a horizontally disposed annular collar or ring member 66, formed integral with and supported in position extending rearwardly from the upper end of a bracket structure 67. The bracket structure is mounted and secured at its lower end to the forward portion of bed plate 61a in a position spaced forwardly from shaft 60 and the pulley DP, as by the machine screws 67a threaded into the bed plate. Bracket structure 67 extends vertically upwardly from bed plate 61a and is upwardly inclined or arched rearwardly and downwardly across the forward side of pulley DP to terminate at the upper end of the pulley and of shaft 60 in the horizontally disposed ring member 66 concentric with and surrounding the upper end of the shaft 60.

The variable effective diameter driving pulley DP provides two V-belt receiving grooves E' therearound which are formed between pairs of circular discs having oppositely beveled or inclined inner faces, with one of the discs of each groove forming pair being fixed and the other disc of the pair being movable axially of the pulley toward and from the fixed disc of the pair to thus vary the effective diameter of the belt receiving groove E' formed therebetween. In the present example, as expressed by the driving pulley DP, the lower pair of discs includes the fixed disc 70 and the movable disc 71 mounted on the extended hub 70b above disc 70, with the discs 70 and 71 having their opposed inner faces a and b beveled radially outwardly in opposite directions to form the V-belt receiving groove E' therearound and therebetween. The uppermost pair of belt groove forming discs consists of lower disc 72 fixed on and relative to extended hub 70b of disc 70, and the movable disc 73 mounted on and over the upper end of extended hub 70b, for axial movement thereon toward and from the fixed disc 72 to vary the effective diameter of the belt groove E' formed around and between these discs. The opposed inner sides of discs 72 and 73 are provided with the oppositely radially outwardly beveled faces c and d, respectively, to form the V-belt receiving groove E' therebetween.

The lowermost disc 70 of the lower pair of discs 70—71 of pulley DP, referring to Fig. 2B, is suitably keyed to shaft 60 for rotation by such shaft but is fixed against axial movement relative to the shaft. Disc 70 has a depending hub portion 70a formed with an axial bore therethrough, which hub extends downwardly from said disc on shaft 60. This depending hub 70a of disc 70 is rotatably received and journaled in an annular anti-friction bearing assembly 74, which is mounted on and around hub 70a, being positioned between that hub and an annular collar or ring portion 61d which extends upwardly in continuation of the bearing mounting ring 61c. The lowermost fixed disc 70 also includes a sleeve forming hub portion 70b which extends upwardly from disc 70 on shaft 60 to uppermost disc 73 which is located adjacent the upper end of shaft 60. The sleeve forming hub 70b of the lowermost disc 70 is suitably keyed to shaft 60 and provides a mounting hub or sleeve for the remaining discs 71, 72 and 73 of the driving pulley DP. The movable disc 71 which forms with the fixed disc 70 therebelow the lowermost V-belt receiving groove E' of the pulley, is mounted on the upwardly extended hub 70b of disc 70 for axial movement on such hub and shaft 60 toward and from the lowermost fixed disc 70. Movable disc 71 is suitably splined to hub 70b for rotation by and with the hub and shaft 60 while permitting axial sliding movements of the disc on the hub.

The lower disc 72 of the uppermost pair of discs 72—73 of the pulley, is mounted on hub 70b above, but in proximity to the movable disc 71, and is suitably keyed to the hub for rotation therewith but held against movement axially of the hub. The uppermost disc 73 which constitutes the movable disc of the upper pair of discs 72—73, is formed with a hub portion 73a which has a sliding fit down over and around the upper end of hub 70b on shaft 60. The hub 73a extends a distance upwardly above discs 73 to terminate in a collar 73b of reduced external diameter, which slidably receives and fits down over the upper end of shaft 60, being suitably splined thereto for rotation by and with the shaft while permitting axial movements thereof relative to the shaft by vertical axial movement of the pulley disc 73. The annular anti-friction bearing assembly 64 is mounted in position on and around the exterior of collar 73b at the upper end of hub 73a of disc 73, and is secured between and connects such collar with the surrounding concentric pulley adjusting actuating sleeve 65. The bearing assembly 64 for the upper end of shaft 60 and pulley DP, thus forms a rotatable coupling which connects the pulley adjusting actuating sleeve 65 with the movable disc 73, through the medium of the collar 73b and hub 73a, and functions to transmit upward or downward reciprocation of sleeve 65 in the fixed ring member 66 carried by the bracket 67, to the disc 73 to correspondingly raise or lower such disc on the sleeve forming hub 70b of the lowermost pulley section 70 on shaft 60, to thereby move said disc 73 from or toward the fixed disc 72 to decrease or increase the effective diameter of belt groove E' formed between said discs.

The movable discs 71 and 73 of the pulley assembly are connected together in a definite relationship, spaced a fixed distance apart, for simultaneous upward or downward movement as a unit on the shaft 60 and sleeve hub 70b of the lowermost disc 70, from and toward the fixed disc 70 and 72 with which the discs 71 and 73 are respectively associated in forming and defining the two V-belt grooves of E' of pulley DP. In this example, the connection of the movable discs 71 and 73 is effected by means of a series of rods 75, which are threaded at their lower ends into suitable vertically disposed bores 75a formed through the disc 71 at spaced locations therearound adjacent the inner hub portion of the disc. These connecting rods 75 extend upwardly through bores 75b respectively, which are formed through the fixed disc 72 in axial alignment with bores 75a. The rods 75 are freely vertically reciprocally received in and extending through the bores 75b for movement therethrough independently of the fixed disc 72. In this instance, the upper end portions of rods 75 are formed and constituted by externally threaded machine screws 75c which are threaded down into internally threaded bores formed in the upper ends of the rods 75, respectively, with the disc 73 clamped and secured between the heads of such screws located at the upper side of disc 73, and the shoulders 75d formed on and around the rods 75, respectively, and located at the under side of the disc 73. Any desired number of the connecting rods 75 may be employed to rigidly connect the movable discs 72 and 73 together for vertical reciprocation as a unit, but whatever the number employed, these rods are preferably spaced equidistant around the axis of the connected discs in order to maintain the discs in rigidly connected relation against any relative movements therebetween under the loads to which the discs may be subjected by the belts E in operation of the pulley.

The actuating sleeve 65 for simultaneously moving the pulley discs 71 and 73 to adjust the effective diameters of the pulley grooves E', is mounted and confined for vertical reciprocation in and through the fixed ring member 66, being in sliding engagement with the inner surface of such ring member but held therein against rotation relative thereto. The upper end portion of the fixed ring member 66 is formed of increased internal diameter to provide a horizontal annular bearing seat 66a therearound surrounding and concentric with actuating sleeve 65. A worm gear 76 of ring form is rotatably mounted and supported on said annular seat 66a in position surrounding and concentric with actuating sleeve 65. Worm gear 76 includes an upwardly extended hub portion 77, and the gear is maintained in rotatably mounted position on seat 66a by a retaining ring 76a which is secured in position over and in sliding engagement with the upper side of said gear around the hub portion 77, by attaching the ring in seated position on the upper edge of ring member 66 by means of machine screws or other suitable fastenings. The worm gear 76 is provided with suitable worm teeth 76b around the external periphery of the gear.

The upper portion of the actuating sleeve 65 is provided with external screw threading 78 therearound which is threadedly engaged with internal screw threading 79 formed around the inner wall or surface of the worm gear 76 and the inner surface of the upwardly extended hub 77 of that gear. Thus, the actuating sleeve 65 is operatively connected with the rotatably mounted worm gear 76 by an irreversible rotatable coupling, so that, rotation of worm gear 76 in its fixed horizontal plane about the axis of sleeve 65 and pulley shaft 60, will, depending upon the direction of rotation of gear 76, force sleeve 65 to translate or move vertically upwardly or to move vertically downwardly within and through the ring member 66 and the worm gear 76. Upward movement of actuating sleeve 65 raises the movable pulley discs 71 and 73 away from the fixed discs 70 and 72 to adjusted positions relative thereto to decrease the effective diameters of the belt grooves E', while downward movement of actuating sleeve 65 lowers the movable discs toward the fixed discs to adjusted positions relative thereto for increased effective diameters for the belt grooves E'. As the discs 71 and 73 are simultaneously moved as a unit through equal distances, it follows that the belt grooves E' are simultaneously adjusted to vary the effective diameters of the belt grooves E' equally.

Referring now to Fig. 2A of the drawings, the variable effective diameter driven pulley SP of the variable speed drive mechanism V, which pulley is mounted on cutter spindle 15 and is driven by driving pulley DP for rotating such spindle, is in all basic structural and mounting respects, identical with the driving pulley DP of the drive mechanism. As the arrangement, construction and mounting of the driving pulley DP have been described in detail hereinabove, it will not be necessary to repeat such detailed description for the pulley SP, beyond pointing out that the pulley SP includes the fixed pulley discs 70' and 72' and the movable discs 71' and 73', which correspond to and are relatively arranged in the same manner as fixed discs 70 and 72 and movable discs 71 and 73, respectively, of the pulley DP. The movable discs 71' and 73' of pulley SP are connected by the rods 75 for movement as a unit so that these movable discs will have infinite positions of adjustment within the range of maximum movement of the discs 71' and 73', to infinitely vary the speed of rotation imparted to cutter spindle 15.

In the case of the spindle driving pulley SP, the rotatable mounting for the lower end of the pulley on the spindle 15 is similar to that for the lower end of pulley DP, and embodies the annular anti-friction bearing assembly 74 mounted and carried in a horizontal plate 74a secured on the upper side of the cutter head 12 of ram structure 10. The upper end of pulley SP is rotatably mounted and journaled in the bearing assembly 64 similar to such bearing assembly for pulley DP, with this bearing assembly 64, forming the rotatable connection or coupling between the set of movable discs 71' and 73' and the vertically reciprocal actuating sleeve 65 for vertically adjusting such set of movable pulley sections 71' and 73' as a unit. This sleeve 65 is mounted for vertical reciprocation in the horizontally disposed, fixed ring member 66' carried by and extending forwardly from a supporting bracket structure 67'. Bracket structure 67' includes a vertical column 67" which is mounted and supported from the cutter head 12 at the rear side of pulley SP. The vertical column 67" in this example, provides a mounting structure for the spindle brake mechanism B; motor starting and stopping switches 21 and 22 and the combined brake and motor control lever L.

The actuating sleeve 65 for pulley SP extends upwardly through the ring member 66' and the worm gear 76 rotatably mounted thereon, with the external threading 78 on sleeve 65 in threaded engagement with the internal threading 79 of worm gear 76 in the identical manner described for these corresponding elements of the actuating mechanism for pulley DP, except that the internal screw threading of worm gear 79 of pulley SP is of opposite hand relative to the threading of worm gear 79 of pulley DP. Thus, rotation of worm gear 76 of pulley SP will, depending upon the direction of rotation of such gear, either force the actuating sleeve upwardly or force it downwardly to raise or lower the movable discs 71' and 73' as a unit to decrease or increase the effective diameters of the belt grooves E' of the pulley SP.

It is to be noted that the invention provides a design and construction of infinitely variable speed drive mechanism which permits the use of variable effective diameter driving and driven pulleys, such as the pulleys DP and SP of the specific example hereof, which are of identical construction so that these pulleys are interchangeable and either of them may be embodied as a driving pulley or as a driven pulley in assembling the drive mechanism, and as the various parts and elements of each pulley and its adjusting mechanism are identical, such parts are interchangeable in assembling the pulleys. Such design and construction eliminates any necessity for providing special designs for the driving and driven pulleys, respectively, or for providing special constructions of elements for either a driving or a driven pulley, with the result that the time and costs of manufacturing the parts and elements for the pulleys and in assembling the pulleys, as well as in mounting the pulleys in the mechanism as driving and driven pulleys, is materially reduced.

In the variable speed drive mechanism V, utilizing the variable effective diameter pulleys DP and SP, such pulleys are mounted relative to each other on the ram structure 10, so that the fixed discs 70 and 72 of pulley DP are disposed in the same respective horizontal planes as the fixed pulleys 70' and 72', respectively, of the pulley SP, to locate the upper and lower pulley grooves E' of pulley DP in general horizontal alignment with the upper and lower belt grooves E' of the pulley SP. The movable discs of the respective pulleys DP and SP are arranged and operatively associated for simultaneous movements in opposite directions to increase or decrease the effective diameters of the belt grooves E' of one pulley and correspondingly and equally decrease or increase the effective diameters of the belt grooves E' of the other pulley. With the movable discs of one pulley at their limit of movement away from the fixed discs for minimum effective diameter of the belt grooves, the movable discs of the other pulley are at their limit of inward movement toward the fixed discs of that pulley for maximum effective diameter of the belt grooves, and vice versa.

Endless, fixed length V-belts E of flexible material are provided for operatively associating the driving pulley DP with the spindle pulley SP for driving the latter to rotate the spindle 15 at a rate of speed determined by the ratio of effective diameters of the belt grooves E' for which the pulleys have been adjusted. These V-belts E may be of the usual V-belt design and construction familiar in this art and of any of the well known commercially available types suitable for this use. The V-belts E are mounted in the belt grooves E' provided by the pulleys DP and SP with each belt extending around the rear side of pulley DP in its respective groove E', and forwardly therefrom to and around the forward side of pulley SP in its respective belt groove E' of that pulley. It is to be here noted, that by the arrangement of bracket structure 67 of pulley DP and bracket structure 67'—67'' of pulley SP, mounted between said pulleys, the rear belt receiving side of pulley SP are both completely unobstructed, either by the pulley brackets or other structure of the pulley assemblies, so that, the belts E, or either of them, may be readily removed from or replaced on the pulleys without requiring disassembly or removal and replacement or reassembly of any part or element of the pulley mounting and supporting structures. To effect belt removal or replacement, it is only necessary to lift the removal cover 11 from position on the unit R enclosing the drive mechanism V, in order to expose the respective unobstructed belt receiving sides of the pulleys, suitable openings being provided in the top wall of the cover 11 for freely passing therethrough the hand lever L and the indicator dial VD.

Attention is particularly directed to the fact that the construction and mounting of each of the similar pulleys DP and SP is such that each pulley with its effective diameter adjusting mechanism and supporting bracket structure 67 or 67', forms a complete self-supporting unit which is supported independently of the shaft with which it is operatively associated in either driving or driven relation. The pulleys DP and SP are self-supporting and aligned and are operable for rotation and for effective diameter adjustment with either or both the shaft 60 in the case of pulley DP, or the spindle 15 in the case of pulley SP, completely removed from operative association with such pulleys. The pulley DP is similar in construction and mounting to pulley SP and may serve as an example of the construction and mounting for both pulleys. The pulley DP is rotatably journaled in and is supported and maintained in position by the bearing assembly 74 at the lower end of the pulley mounted between the adjacent fixed supporting structure and the depending hub 70a of fixed disc 70, and by the bearing assembly 64 mounted in the ring member 66 of bracket 67 at the upper end of the pulley, which bearing receives and rotatably journals therein the upwardly extended hub portion 73b of the upper movable disc 73 of the pulley. The adjusting mechanism for varying the effective diameter of the pulley DP is mounted and supported on ring member 66 as hereinbefore explained. The pulley disc 73 is mounted and supported on the upwardly extended hub 70b of the lowermost pulley disc 70, and similarly discs 71 and 72 are also mounted and supported on such extended hub 70b. Thus, the complete pulley hub formed by the hub 70a—70b of disc 70 and hub 73a—73b of disc 73, provides an axial bore therethrough for receiving a shaft, such as shaft 60, in driving or driven relation with the pulley as may be desired, but such shaft, if used, does not mount and support the pulley DP thereon, the pulley being supported and positioned independently of shaft 60 by bearing assemblies 74 and 64 (see Fig. 2B).

In accordance with a further feature of the variable speed drive V of the mechanism of the invention, provision is made for continuously, automatically maintaining the required degree of belt tension on the belts E in mounted position thereof on and connecting the pulleys DP and SP in driving relation. In the specific expression of this feature in the present example, the carriage 61 which mounts and supports the complete assembly of the driving pulley DP together with its supporting bracket structure, is mounted for floating under the action of a spring loading which continuously exerts forces on the carriage acting in a direction to move the carriage with the pulley DP away from the spindle pulley SP.

Referring now particularly to Figs. 2B, 9 and 10, the carriage 61 includes the horizontal bed plate 61a extending across and between the opposite side, parallel tubular members 90. A carriage supporting and guiding rod 91 is fixed in and extends longitudinally through each tubular member 90 with the opposite ends of each rod extended a distance upwardly beyond the opposite ends of its tubular mounting member. Thus, a pair of spaced, parallel and horizontal disposed supporting rods 91 are provided for movably mounting carriage 61 for horizontal movements in opposite directions along a straight line path disposed longitudinally of ram structure 10. The spaced forward ends of the supporting and guiding rods 91 are slidably mounted, respectively, in anti-friction bearing blocks 92, such bearing blocks being spaced apart in alignment transversely of and being mounted and supported on and from the ram structure 10. The spaced rear ends of the rods 91 are mounted in a pair of similar bearing blocks 92.

The bearing blocks 92 are identical, and the construction thereof is illustrated in detail in Fig. 10 of the drawings. Each block includes a mounting stem 92a which depends therefrom in vertically disposed position and is received in a vertical bore 92b in a boss 92c formed fixed to or integral with ram structure 10. The under side of a bearing block 92 is engaged and seats upon the upper edge surface of boss 92c surrounding stem 92a, such engaging surfaces being machined to accurately position the bearing block. Each bearing block 92 is formed with a bore 92d therethrough which in mounted position of the block is axially aligned with a carriage mounting rod 91 for receiving a rod for reciprocation therein and therethrough. In this instance the projecting opposite end lengths of each rod 91 which are received in bearing blocks 92, respectively, is formed with axially disposed upper and lower, parallel grooves forming anti-friction ball races 91a and 91b therein which are located in diametrically opposite sides of the rod. Series of anti-friction balls 93 are mounted within the bore 92d of a bearing block 92, located in the upper and lower ball races 91a and 91b, respectively, of rod 91. Each series of balls 93 is confined between ball retainers 93a mounted in bearing block 92 located adjacent opposite ends thereof and extending into the adjacent ball race of rod 91, as will be clear by reference to Fig. 10.

By referring to Fig. 10a, it will be noted that the grooves provided in a rod 91 to form the ball races 91a and 91b respectively, are of V-shape in cross section. Thus, each set of anti-friction balls 93 is positioned in its ball race forming V groove 91a or 91b, with the balls of the set revolvably confined between the opposite outwardly diverging side walls of the groove and the adjacent portion of the curved surface opposite the groove, provided by the truly cylindrical bore 92d formed through the bearing block 92. As a result of this construction and arrangement, the radial alignment of the ball race forming grooves 91a and 91b, which are located in diametrically opposite sides of a rod 91, becomes relatively unimportant and such radial alignment is thus not a critical factor in assuring rigidity and accuracy of the mounting of a rod 91 in a bearing block 92. Such construction also makes for ease and low cost of manufacture by eliminating the necessity of forming grooves in the cylindrical wall of the bore 92d in a block 92 for alignment with the grooves 91a and 91b in a rod 91. Further, such bearing construction and arrangement is easily pre-loaded by merely controlling the diameter of the bore 92d in a bearing block 92, or by selecting anti-friction balls 93 of a proper diameter.

It will be further noted by reference to Fig. 10 of the drawings, that in this type of anti-friction bearing mounting for a reciprocating rod member, the anti-friction balls 93 move laterally a distance equal to approximately one-half (½) of the distance that the rod 91 moves, so that the length of the space between the retaining plates 93a and the total number of balls 93 must be greater by a distance equal to approximately one-half (½) the distance of travel of the rod 91.

Thus, carriage 61 is mounted and supported at its forward end by the forwardly extended portions of the rods 91 received in the spaced forward bearing blocks 92, respectively, for free horizontal reciprocation therein and therethrough on the series of anti-friction balls 93; and, similarly, carriage 61 is supported at the rear end thereof by the rearwardly extended portions of rods 91 which are received and supported in the spaced bearing blocks 92, respectively, positioned at the rear end of the carriage, for free reciprocation in such blocks on the anti-friction balls therein. In this manner, carriage 61 with pulley DP thereon is supported from the forward and rear bearing blocks 92 by the spaced supporting and guiding rods 91, for horizontal reciprocation toward and from spindle pulley SP. This horizontally reciprocal carriage is spring loaded by coil expansion springs 94 which are mounted on and around the projecting rear ends, respectively, of rods 91 between the rear side of bearing blocks 92 which are fixed relative to rods 91 and carriage 61, and suitable heads or caps 94a fixed on and movable with the rods at the extreme rear ends thereof. The expansion springs 94, being confined between fixed blocks 92 and heads 94a on movable rods 91, continuously act to exert forces on rods 91 to force such rods rearwardly and thus move carriage 61 rearwardly in a direction away from spindle pulley SP. The springs 94 are so arranged relative to the position of carriage 61 and pulley DP thereon, that with belts E in driving relation on pulleys DP and SP, carriage 61 is moved a distance sufficiently forwardly as to place springs 94 under compression to develop a total force of required magnitude to continuously maintain the belts E under the desired tension on and between the pulleys. It is to be noted that by such carriage arrangement in addition to the automatic maintenance of belt tension, the removal and replacement of belts is rendered easier due to the fact that carriage 61 may be forced forwardly toward pulley SP to thus reduce the spacing therebetween and completely loosen the belts.

If desired, an adjustable stop screw 95 is threaded into the rear end of bed plate 61a in centrally located position thereon disposed longitudinally thereof between rods 91, for engagement with a stop member or lug 95a extending upwardly from the ram structure 10 spaced rearwardly from and in line with screw 95. This stop screw may be adjusted to function to engage lug 95a to arrest rearward movement of carriage 61 when the belts are removed therefrom.

Referring now to Figs. 2A and 2B of the drawings, the infinitely variable speed drive mechanism V is shown therein in full lines in adjusted position for minimum low speed of rotation of spindle 15, in that, the movable discs 71 and 73 of the driving pulley DP are at their limit of movement upwardly or away from fixed discs 70 and 72 to thus adjust belt grooves E' to their minimum effective diameters, while the movable discs 71' and 73' of pulley SP are at their limit of downward or inward movement in position adjacent the fixed discs 70' and 72' to thus adjust belt grooves E' of pulley SP to their maximum effective diameters. The reversed position of adjustment of the pulleys of the drive V for maximum high speed rotation of spindle 15, in which the movable discs 71 and 73 of pulley DP are at their limits of inward movement positioned adjacent the fixed discs 70 and 72 for maximum effective diameters of belt grooves E', while the movable discs 71' and 72' of pulley SP are at their limits of movement away from the fixed discs 70' and 72' for minimum effective diameters of belt grooves of E', of pulley SP, is indicated by dotted lines in Figs. 2A and 2B. Thus, by simultaneously translating the respective movable discs of pulleys DP and SP equal distances in opposite directions to any desired position of adjustment between such maximum positions, an infinite number of adjusted positions is possible for the drive with resulting infinite variations in the rate of speed at which the drive mechanism will rotate the cutter spindle 15.

Operator control is provided for selective precision adjustment of the drive mechanism V for infinite variations in the rate of speed at which the cutter spindle 15 will be rotated by the drive. Such an adjustment control is characterized by simultaneous movements in opposite directions and in equal amounts of the movable sections of the driving and driven pulleys DP and SP, respectively, from a single operator control point by means of a single manual control member.

As expressed in this specific example, such operator control, referring now to Figs. 1, 7 and 8, includes a single, manual operating element in the form of the hand crank VC (see Fig. 1) located at the forward end and on the right hand side of the unit R when facing the front of the unit. This hand crank VC is fixed on a horizontally disposed shaft 100 supported and rotatably journaled in a suitable shaft housing 100a formed or provided on the forward, right hand side of the ring member 66' of bracket structure 67', with such shaft disposed generally tangentially or transversely relative to the ring member. A worm shaft 101 is rotatably journaled in the shaft housing 100a in position disposed longitudinally of the unit R with its axis perpendicular to the axis of shaft 100. Shaft 101 is located in position extending across but above shaft 100 and is provided with a right angle spiral gear 102 thereon which is in operative mesh with a complementary right angle spiral gear 103 fixed on shaft 101, so that, rotation of shaft 100 by crank VC will rotate the worm shaft 101 through the engaged right angle spiral gears 102 and 103. A worm 104 is fixed on shaft 101 spaced rearwardly from spiral gear 102, in position to mesh with worm gear 76 of the adjusting mechanism of pulley SP. Rotation of shaft 101 by the shaft 100 will rotate worm 104 which is in engagement with worm gear 76, and, depending upon the direction of rotation of shaft 100, will cause upward or downward movement of the actuating sleeve 65 of pulley SP, to translate the movable discs 71' and 73' of pulley SP upwardly or downwardly to increase or decrease the effective diameters of belt grooves E' of this pulley.

The adjusting mechanism of pulley DP is actuated by and from worm shaft 101, in synchronization with the operation of the adjustment mechanism of pulley SP by such shaft, through an arrangement of shafting which includes a worm shaft 105 mounted and journaled in a shaft housing 106 formed or provided on the right hand side of ring member 66 of bracket structure 67 of the adjusting mechanism for the pulley DP. Worm shaft 105 is mounted in housing 106 in axial alignment with worm shaft 101 of the adjusting mechanism for pulley SP, and includes a worm 107 fixed thereon in mesh with the worm gear 76 of the adjusting mechanism of pulley DP. The forward end of worm shaft 105 is operatively coupled and connected in driving relation with the rear end of worm shaft 101, by a tubular shaft section 108. The forward end of tubular shaft 108 fits over and receives the rear end of shaft 101, being fixed to the rear end of shaft 101 for rotation therewith by a pin 108a. The rear end of tubular shaft 108 fits over and slidably receives the forward end of worm shaft 105, and is splined or keyed to the latter shaft for rotation therewith while permitting axial sliding movement of shaft 105 in and relative to tubular shaft 108. Any suitable or usual key 105a may be provided for coupling shaft 108 with worm shaft 105 to permit such relative axial movements between these rotatively connected shafts. By providing such coupling between worm shaft 105 and the tubular shaft 108 for free relative axial movements of worm shaft 105 in shaft 108, the pulley assembly on carriage 61 is enabled to "float" and freely move as a unit toward and from pulley SP while maintaining driving connection between the worm shafts 101 and 105.

With the foregoing arrangement, the operator by rotating shaft 100 by hand crank VC in the required direction simultaneously rotates worms 104 and 107 to rotate worm gears 76, respectively, of the pulley adjusting mechanisms of pulleys SP and DP to simultaneously adjust the pulleys equal amounts in opposite directions to vary the effective diameters of the pulleys and the resulting ratios therebetween, so as to selectively determine the speed at which pulley SP will rotate cutter spindle 15. It so happens that in the present example, the maximum adjustment of the pulleys SP and DP requires approximately 315° of rotation of the worm gears 102 and 103, or approximately seven-eighths (⅞) of a complete revolution of the hand crank TC between its position of adjustment of the pulleys for maximum speed of rotation of cutter spindle 15 and its position of adjustment of the pulleys in the opposite directions for minimum low speed or rotation of the spindle.

The indicator dial VD, referring now particularly to Figs. 1, 2B and 7 of the drawings, is formed as a hollow bowl-like casting 110, having a closed upper or top side and an annular open collar or neck 110a depending from the lower side thereof which fits down over the exterior of the upper end of hub 77 of worm gear 76 of the adjusting mechanism of pulley DP, being suitably secured in position on the upper end of such hub by suitable set screws or the like 110b (see Fig. 2B). Indicator dial VD is thus mounted and fixed on hub 77 for rotation therewith about the vertical axis of rotation of pulley DP, by rotation of gear 76. The annular exterior side wall surface of indicator dial VD is formed and divided, in this instance, into a series of four (4) vertically spaced, horizontal bands therearound for receiving suitable indicia for indicating rates of speed of rotation of the cutter spindle 15 in accordance with the position to which dial VD has been rotated by rotation of gear 76 to the adjusted positions of pulleys SP and DP.

The four (4) indicia carrying bands are identified in the drawings as I, II, III and IV, respectively, and each band carries the indicia for speed rates within the range of spindle speeds for one of the four (4) basic or primary speeds of which the output shaft 40—40b from the change speed transmission T is capable, as hereinbefore explained. Thus, as an example, band I is marked with indicia for speeds within the minimum low speed range provided by operation of motor M and of change speed transmission T at their respective "low" speeds; band II is marked for speeds within the range of spindle speeds with the motor M at "low" speed and transmission T at "high speed;" band III is marked for speeds within the range of spindle speeds with motor M at "high" speed and transmission T at its "low" speed adjustment; and band IV is marked for speeds within the range of speeds with the motor at "high" speed and the change speed transmission also in its "high" speed adjustment. The speed indicia on each of the four speed range bands I, II, III, and IV are, of course, placed on and spaced around the band calibrated relative to the corresponding positions, respectively, of adjustment of pulleys DP and SP to visually indicate from a given reading position, the rate of rotation at which the cutter spindle 15 will be operated by the pulleys DP and SP of drive V for such adjustment of the pulleys.

A suitable index plate arrangement is provided, from which the operator may visually determine or read off from the indicator dial VD the rate of speed at which the cutter spindle 15 will be rotated by the drive at various positions of adjustment of the pulleys DP and SP, with the motor M conditioned for either its "High" or "Low" speed of operation and the change speed transmission T adjusted to either its "High" or "Low" output rate of speed. Referring now to Fig. 11 of the drawings, such an arrangement may, as in the specific example hereof, include an index plate 150 mounted in vertically disposed position on the ring member 66 of the supporting bracket structure 67 for pulley DP, in a desired location relative to the forward end or front of the machine for ease of reading by the operator. This index plate 150 extends vertically upwardly across the exterior of the side wall surface of indicator dial VD on which the four (4) indicia carrying bands I, II, III, and IV, are formed, suitable clearance being provided between the inner side of the plate and the adjacent dial surface for rotation of the dial without interference from the plate. The index plate 150 is formed with a vertically disposed and, in this instance, generally rectangular reading opening 151 therein which extends across the indicia bearing bands I, II, III, IV, of the dial VD, with indicia on such bands being visible through opening 151 when the dial is rotated to locate such indicia within the opening. The reading opening 151 has a width to expose single indicia or indicia units therein for reading therethrough, so that the reading opening always exposes and displays a vertical column of indicia formed by the exposed indicia on the bands I, II, III, and IV, respectively.

The index plate 150, preferably at the upper end thereof above the reading opening 151, may be provided with the legend "Spindle Speeds R. P. M." The spaces at the opposite sides of the reading opening 151 form opposite side columns for listing the legends "High" and "Low," for the high and low speed operating conditions of the motor M and the change speed transmission T. For example, in this instance, the legend column at the right of the reading opening 151, carries such legends for the high and low operating conditions of the motor M, a legend "Low" being positioned in line with the lowermost indicia band I, the legend "High" being aligned with indicia band II, the legend "Low" being aligned with indicia band III, and the legend "High" being aligned with the uppermost indicia band IV. The plate 150 may carry the legend "Spindle Motor" thereon below the legend column at the right hand of opening 151. The legend column at the left of the reading opening carries the "High" and "Low" legends for the high and low output speeds of operation of the transmission T, with a legend "Low" being located on the portion of the column opposite indicia bands I and II, and a legend "High" being located on the portion of the column opposite the indicia bands III and IV, of the indicator dial VD. The plate 150 may carry the legend "Clutch" thereon at the lower end of the left hand legend column of the plate.

In using such index plate arrangement with the indicator dial VD, the operator conditions motor M for either high or low speed operations and transmission T for either its high or low speed output operation. The variable speed drive is then adjusted by the operator through the medium of the hand crank VC, to rotate the dial until the indicia for the desired rate of speed of operation of the spindle 15 appears in the reading opening 151 of the index plate 150, opposite the "High" or "Low" legend, of the transmission speed column and aligned with the "High" or "Low" legend of the motor speed column. For instance, if a spindle speed of 6000 R. P. M. is desired, the operator would first have conditioned both the motor M and the transmission T for high speed operation and then have adjusted the drive until the indicator dial VD had been rotated to position the indicia "6000" on dial band IV, in the reading opening 151 opposite the "High" space of the transmission speed column at the left of the opening 151 and aligned with the "High" legend of the motor speed column aligned with band IV at the right of the opening.

While the pulleys DP and SP of the infinitely variable speed drive mechanism V are, in the particular example illustrated and described herein, of the type providing but two (2) belt grooves for use with two (2) belts, it is to be understood, as will be evident to those skilled in the art, that the design and construction of the variable effective diameter pulleys of the invention is such as to permit of multiplication of the pairs of fixed and movable belt groove forming discs by adding such pairs of discs to a pulley and increasing the length of the connecting rods 75 so as to join all of the movable discs for simultaneous operation as a unit toward and from the fixed discs, respectively, for effective diameter adjustment. And while multiple belt pulleys are preferable for drive applications such as that of the cutter spindle of the present example, attention is directed to the fact that a pulley and its adjusting mechanism of the invention may embody a single pair of discs to provide a single belt groove capable of effective diameter variation for a one belt drive. Hence, the invention contemplates and includes both multi-belt pulleys utilizing more than two (2) belts, as well as single belt pulleys.

Operational summary

The self-contained spindle ram and variable speed drive unit R of the invention, as specifically expressed in the instant example, may be considered to be mounted in horizontally disposed position on the column or main frame C of a vertical cutter spindle type of machine tool, so that the unit, with and including all the component drive and power transmission organizations thereof, may be adjusted horizontally as a unit to desired positions on and relative to the machine tool. Due to the operative combination of and relationship between the multi-speed motor M, the change speed transmission T, and the infinitely variable speed drive V for the cutter spindle 15, a very wide over-all speed range is provided by the unit for the spindle, within which the drive V may be infinitely adjusted for infinite variation in the rate of rotation at which spindle 15 may be operated by the drive.

In the operation and use of the unit R, the operator selectively conditions the motor M for its "low" speed or "high" speed operation and adjusts the change speed transmission T for either its "Low" or "High" speed of operation for driving the variable speed drive V at the required rate of speed to provide the desired speed range within which the drive V is to be adjustable for infinite variations in the rate of rotation at which the cutter spindle 15 may be rotated by the drive. In the specific example of unit R, the operator is offered four (4) basic speeds of operation for the change speed transmission T, that is, for the rate of rotation at which the output shaft 40—40b thereof which is coupled with and drives the variable speed drive V, may be driven. These four basic output speeds from transmission T thus provides four (4) speed ranges through which the rate of rotation of cutter spindle 15 may be infinitely varied by selective operator controlled adjustment of the drive V.

The change speed transmission T is selectively adjustable by the operator for either "high" or "low" speed output to variable speed drive V, from the single conveniently located and readily accessible control point provided by the single operating element formed by the hand crank TC. The operator merely swings this crank TC forwardly to "High" speed position of adjustment (see Figs. 1 and 6) or rearwardly to position of low speed adjustment indicated by the word "Low," appearing at the rear end of the indicator plate 57 (see Fig. 6). Such adjustments of the change speed gears of the transmission T, due to the construction and arrangement of the clutches and their actuating mechanism, may be made without stopping operation of motor M, and with but a momentary interruption to the operation of transmission T and drive V as the clutches simultaneously pass through their neutral positions.

The infinitely variable speed drive V is adjustable for speed variations by the operator from a single control point by means of a single control element provided by the hand crank VC which is conveniently located for the operator at the forward, right hand side of the unit R. Hand crank VC is rotatable in one direction to adjust the pulleys DP and SP to increase speed of rotation of spindle 15 and in the opposite direction to decrease speed or rotation of such spindle. The operator adjusts the drive V by rotating crank VC until the indicator dial VD is rotated to position the desired rate of rotation indicia in the reading opening 151 of index plate 150, relative to the "High" and "Low" legends on the motor and transmission speed columns of the plate. The desired rate of rotation indicia is, of course, selected from that one of the indicator bands, I, II, III or IV, which carries the indicia for the selected speed range at which motor M and change speed transmission T have been adjusted by the operator, as hereinbefore explained.

In the present example of motor M and change speed transmission T, the design is such that the rate of rotation of the output shaft 40—40b from the transmission T to the pulley DP of drive V, may be selectively adjusted for operation at any one of four (4) rates of rotation, namely 425, 862, 1700 and 3450 R. P. M. The spindle pulley SP and cutter spindle 15 thus have an over-all speed range composed of the four (4) speed ranges through which the rate of rotation of the spindle 15 is infinitely variable by the drive V, such over-all speed range being from a minimum of 250 R. P. M. to a maximum of 6000 R. P. M., and being composed of the following ranges, any one of which may be selected, and through which the rate of rotation of spindle 15 may be infinitely varied; namely, 250 R. P. M. to 750 R. P. M.; 500 R. P. M. to 1500 R. P. M.; 1000 R. P. M. to 3000 R. P. M.; and 200 R. P. M. to 6000 R. P. M.

In connection with that feature of the invention which provides as a self-contained unit, a spindle carrying ram with a motor, change-speed transmission and infinitely variable speed drive from the transmission to the spindle, it is to be understood that the disclosure herein of the particular multi-belt, variable effective diameter pulley drive of the invention, is not intended to be restrictive as to the broad combination, as other types and constructions of multi-belt or single belt, variable effective diameter pulley drives may be utilized, as well as types of infinitely variable speed drive mechanisms or units other than such multi-belt, variable effective diameter infinitely variable types of speed drives.

It will also be evident to those skilled in the art, that various changes, modifications, substitutions and eliminations might be resorted to without departing from the spirit and scope of the invention and, hence, it is not desired to limit this invention in all respects to the exact and specific disclosures of the examples of the ivention herein described, except as may be required by specific intended limitations thereto included in any of the appended claims.

What we claim is:

1. In an infinitely variable speed drive mechanism, in combination, a supporting structure, a driven pulley rotatably mounted on said structure, a floating carriage mounted on said structure for movement toward and from said driven pulley in a plane perpendicular to the axis of that pulley, spring means associated with said carriage continuously acting to yieldingly move said carriage in a direction away from said driven pulley, a driving pulley rotatably mounted on said carriage in position with its axis parallel with the axis of said driven pulley, said driving and driven pulleys having V-belt receiving grooves therearound and each being adjustable to vary the effective diameters of said grooves, a bracket structure mounted on said carriage in position located between said driving pulley and said driven pulley and extending over the outer end of said driving pulley to provide a bearing support therefor, and a second bracket structure mounted between said driven pulley and the adjacent end of said carriage and extending over the outer end of said driven pulley to provide a bearing support therefor.

2. In an infinitely variable speed drive mechanism, in combination, a supporting structure, a driving pulley rotatably mounted on said structure, a driven pulley rotatably mounted on said structure in position with its axis parallel with the axis of said driving pulley, each of said pulleys providing V-belt receiving grooves therearound and each being adjustable to vary the effective diameter of said belt grooves, a bracket structure mounted on said supporting structure adjacent said driving pulley between said pulley and said driven pulley and being extended over the outer end of said driving pulley to provide a bearing support therefor, a second bracket structure mounted adjacent said driven pulley between said pulley and said first mentioned bracket structure and being extended over the outer end of said driven pulley to provide a bearing support therefor, pulley adjusting members mounted in said bracket structure bearing supports, respectively, in operative association with said pulleys, and actuating mechanism mounted on and extending between said bearing supports in operative association with said pulley adjusting members for simultaneously actuating said members to simultaneously adjust said pulleys in opposite directions and in equal amounts.

3. In an infinitely variable speed drive of the multiple V-belt type, a shaft, a variable effective diameter pulley mounted on said shaft for rotation therewith, said pulley including a fixed disc keyed on said shaft and having a sleeve forming hub portion extending from one side thereof along said shaft, a movable disc mounted adjacent said fixed disc on said sleeve forming hub to form a V-belt receiving groove around and between said discs, said movable disc being splined on said sleeve forming hub for movement axially thereof toward and from said fixed disc to increase and decrease the effective diameter of the belt groove therebetween, a second fixed disc mounted on said sleeve forming hub at the side of said movable disc opposite said first mentioned disc, a second movable disc mounted on said shaft adjacent said second fixed disc to form a V-belt receiving groove around and between said discs and being movable axially of said shaft toward and from said second disc to increase and decrease the effective diameter of the belt receiving groove therebetween, said second movable disc having an outwardly extended hub portion receiving and splined on said shaft with said hub portion extended inwardly over and slidably receiving the adjacent end of the extended sleeve forming hub portion of said first mentioned fixed disc, and rod members connecting said movable discs for movement thereof as a unit, axially of said shaft toward and from said fixed discs, respectively, said rod members being freely slidably extended through the second fixed disc positioned between said movable discs for movement of said rods with said movable discs as a unit independently of said fixed discs.

THEODORE F. ESERKALN.
FREDDY STEINBRECKER.

REFERENCES CITED

The following references are of record in the file of this patent:

UNITED STATES PATENTS

| Number | Name | Date |
|---|---|---|
| 1,844,239 | Boehme | Feb. 9, 1932 |
| 1,862,052 | Gorton | June 7, 1932 |
| 2,091,321 | Kinsella | Aug. 31, 1937 |
| 2,156,596 | Lloyd | May 2, 1939 |
| 2,320,776 | Gorton | June 1, 1943 |
| 2,398,235 | Luenberger | Apr. 9, 1946 |